US012693651B2

(12) United States Patent
Urick et al.

(10) Patent No.: US 12,693,651 B2
(45) **Date of Patent: \*Jul. 28, 2026**

(54) WATERTIGHT SPLINE MODELING FOR ADDITIVE MANUFACTURING

(71) Applicant: nVariate, Inc., Austin, TX (US)

(72) Inventors: Benjamin Urick, Roseville, CA (US); Richard H. Crawford, Austin, TX (US); Daniel L. Keller, Waitsfield, VT (US)

(73) Assignee: nVariate, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/416,783

(22) Filed: Dec. 11, 2025

(65) Prior Publication Data

US 2026/0111006 A1     Apr. 23, 2026

Related U.S. Application Data

(63) Continuation of application No. 17/865,863, filed on Jul. 15, 2022, now Pat. No. 12,530,016.

(60) Provisional application No. 63/229,363, filed on Aug. 4, 2021, provisional application No. 63/227,581, filed on Jul. 30, 2021.

(51) Int. Cl.
| | |
|---|---|
| *G05B 19/4099* | (2006.01) |
| *G06F 30/10* | (2020.01) |
| *G06F 113/10* | (2020.01) |
| *G06F 119/18* | (2020.01) |

(52) U.S. Cl.
CPC ......... *G05B 19/4099* (2013.01); *G06F 30/10* (2020.01); *G05B 2219/49007* (2013.01); *G06F 2113/10* (2020.01); *G06F 2119/18* (2020.01)

(58) Field of Classification Search
CPC ...... G05B 19/4099; G05B 2219/49007; G06F 30/10; G06F 2113/10; G06F 2119/18
See application file for complete search history.

(56) References Cited

U.S. PATENT DOCUMENTS

| | | | |
|---|---|---|---|
| 2018/0022032 A1* | 1/2018 | Mark | B29C 64/118 |
| | | | 700/98 |
| 2018/0178446 A1* | 6/2018 | Nosenzo | B29C 64/153 |
| 2020/0051333 A1* | 2/2020 | Shayani | G06T 17/205 |

OTHER PUBLICATIONS

Ma ("An adaptive slicing and selective hatching strategy for layered manufacturing" from "Journal of Materials Processing Technology 89-90 (1999) 191-197") (Year: 1999).*

(Continued)

*Primary Examiner* — Yuhui R Pan
(74) *Attorney, Agent, or Firm* — Kowert, Hood, Munyon, Rankin & Goetzel, P.C.; Jeffrey C. Hood; Luke Langsjoen

(57) ABSTRACT

Methods and computer systems for utilizing gapless surface models in computer-aided design (CAD) applications to produce printing instructions for additive manufacturing (AM). A geometrically watertight CAD spline model of an object to be printed is received. For of a plurality of AM layers of the object, an intersection routine is performed of a plane of the layer with the geometrically watertight CAD spline model to obtain a respective smooth contour curve. For each AM layer, a plurality of hatch curves is determined within the plane of the layer and interior to the respective smooth contour curve. The smooth contour curves and the pluralities of hatch curves are stored in a non-transitory computer-readable memory medium.

20 Claims, 19 Drawing Sheets

(56) References Cited

OTHER PUBLICATIONS

Song ("Function representation based slicer for 3D printing" from "Computer Aided Geometric Design 62 (2018) 276-293") (Year: 2018).*

Ravi ("Improve the accuracy, surface smoothing and material adaption in STL file for RP medical models" from "Journal of Manufacturing Processes 21 (2016) 46-55") (Year: 2016).*

* cited by examiner

CAD B-rep model:
trimmed surfaces
(exploded view)

CAD B-rep model:
actual surfaces

CAD B-rep model:
render

*smooth spline curves:*
simple, lightweight description
direct to AM printer contour
C centerline path i contour
C control polygon i $P^k_{i\_n}$ $P^k_{i\_(n+1)}$ hatch
vector border / fill
contour slice
layer AM build partial section hatch layers contour layers

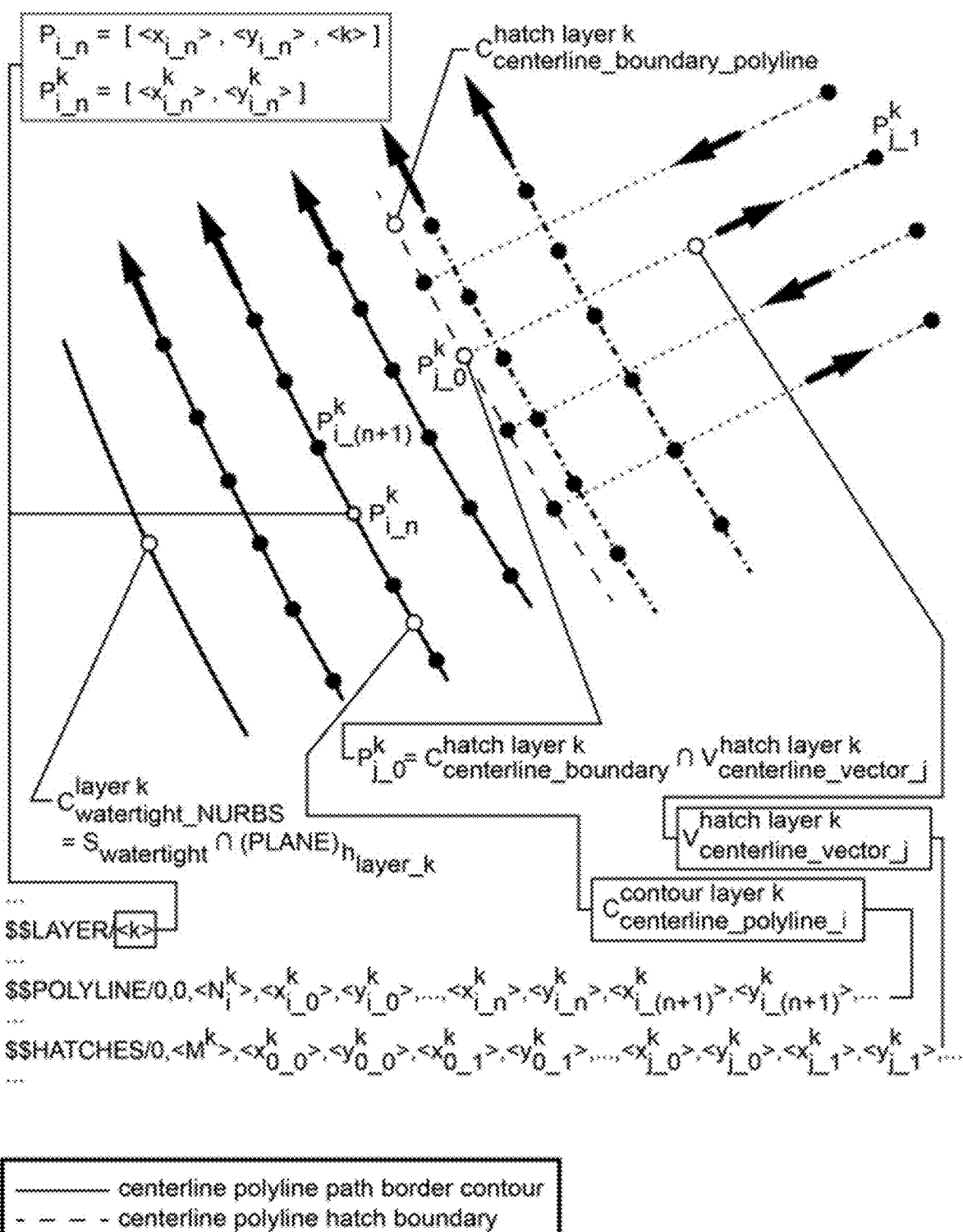

$$P_{i\_n} = [\,\langle x_{i\_n}\rangle,\ \langle y_{i\_n}\rangle,\ \langle k\rangle\,]$$

$$P^k_{i\_n} = [\,\langle x^k_{i\_n}\rangle,\ \langle y^k_{i\_n}\rangle\,]$$

$C^{\text{hatch layer } k}_{\text{centerline\_boundary\_polyline}}$ $P^k_{L\_1}$ $P^k_{L\_0}$ $P^k_{L\_(n+1)}$ $P^k_{i\_n}$ $$P^k_{i\_0} = C^{\text{hatch layer } k}_{\text{centerline\_boundary}} \cap V^{\text{hatch layer } k}_{\text{centerline\_vector\_j}}$$

$V^{\text{hatch layer } k}_{\text{centerline\_vector\_j}}$ $C^{\text{contour layer } k}_{\text{centerline\_polyline\_j}}$ $$C^{\text{layer } k}_{\text{watertight\_NURBS}} = S_{\text{watertight}} \cap (\text{PLANE})_{h\_\text{layer}\_k}$$

...

$$\$\$LAYER,\langle k\rangle$$

$$\$\$POLYLINE/0,0,\langle N^k_i\rangle,\langle x^k_{i\_0}\rangle,\langle y^k_{i\_0}\rangle, \dots \langle x^k_{i\_n}\rangle,\langle y^k_{i\_n}\rangle,\langle x^k_{i\_(n+1)}\rangle,\langle y^k_{i\_(n+1)}\rangle \dots$$

$$\$\$HATCHES/0,\langle M^k\rangle,\langle x^k_{0\_0}\rangle,\langle y^k_{0\_0}\rangle,\langle x^k_{0\_1}\rangle,\langle y^k_{0\_1}\rangle, \dots \langle x^k_{j\_0}\rangle,\langle y^k_{j\_0}\rangle,\langle x^k_{j\_1}\rangle,\langle y^k_{j\_1}\rangle \dots$$

...

———— centerline polyline path border contour

- — — - centerline polyline hatch boundary

-·—··—·· centerline polyline path fill contour

············ centerline polyline path hatch

*FIG. 17*

WATERTIGHT SPLINE MODELING FOR ADDITIVE MANUFACTURING

PRIORITY CLAIM

This application is a continuation of U.S. application Ser. No. 17/865,863, filed on Jul. 15, 2022, titled "Watertight Spline Modeling for Additive Manufacturing", which claims benefit of priority to U.S. Provisional Application No. 63/227,581, filed on Jul. 30, 2021, titled "Watertight Spline Modeling for Additive Manufacturing", and U.S. Provisional Application No. 63/229,363, filed on Aug. 4, 2021, titled "Watertight Spline Modeling for Additive Manufacturing", all of which are hereby incorporated by reference as though fully and completely set forth herein.

ACKNOWLEDGEMENT OF GOVERNMENT SUPPORT

This invention was made with Government support under Honeywell Federal Manufacturing and Technologies (HFMT) Purchase Order Number: N000339686, HFMT Purchase Order Number: N000374792, HFMT Purchase Order Number: N000389324, and HFMT Purchase Order Number N000420599. Purchase orders were issued under HFMT's prime contract DE-NA0002829 and awarded by the United States Department of Energy. The Government has certain rights in the invention.

FIELD OF THE INVENTION

The present invention relates generally to the fields of additive manufacturing (AM) and computer-aided design (CAD), and more particularly, to mechanisms for utilizing geometrically watertight CAD spline models for performing AM.

DESCRIPTION OF THE RELATED ART

The computer-aided design of models for objects is fundamentally important to a variety of industries such as computer-aided engineering (CAE), computer-aided manufacturing (CAM), computer graphics and animation. For example, a model may be used as the basis of an engineering analysis, to predict the physical behavior of the object. The results of such analysis may be used in a wide variety of ways, e.g., to inform changes to the design of the object, to guide selection of material(s) for realization of the object, to determine performance limits (such as limits on temperature, vibration, pressure, shear strength, etc.), and so forth. As another example, a model may be used to direct the automated manufacturing of the object. As yet another example, a model may be used to generate an image (or a sequence of images, e.g., as part of an animation of the object). These activities may represent typical product design development steps found across industrial market verticals such as automotive, aerospace, and oil and gas.

Modern CAD software applications may be built on software kernels that utilize restrictive mathematical assumptions to approximate compound geometric objects. As a result, critical information may not be explicitly modeled, forcing designers, engineers, manufacturers, animators, etc., to repair CAD models and convert them into an acceptable format, such as polygonal meshes for finite element analysis (FEA) or computational fluid dynamics (CFD), 3-D printing or additive manufacturing, character animation, etc. This conversion is typically an iterative process, creating substantial amounts of work for product development teams. Designers, engineers, manufacturers, animators, etc., waste countless hours manually repairing gaps in models and dealing with redundant one-way file conversion operations, causing significant productivity losses, increased time to market and user frustration and dissatisfaction. As such, improvements in the field of CAD modeling may be desirable.

SUMMARY

Embodiments are presented herein of methods, computer systems, and computer-readable memory media for utilizing gapless surface models in computer-aided design (CAD) applications to produce printing instructions for additive manufacturing (AM). In one set of embodiments, a computer-implemented method for producing AM printing instructions is implemented, wherein the method comprises performing, by the computer, receiving a geometrically watertight CAD spline model of an object to be printed.

In some embodiments, for each of a plurality of layers of the object, an intersection routine is performed of a respective plane of the layer with the geometrically watertight CAD spline model to determine a respective smooth contour curve.

In some embodiments, for each of the plurality of layers, a respective plurality of hatch curves is determined within the respective plane of the layer and interior to the respective smooth contour curve.

In some embodiments, the smooth contour curves and the pluralities of hatch curves are stored in a non-transitory computer-readable memory medium.

In some embodiments, a software file may be written based at least in part on the smooth contour curves and the hatch curves, where the software file includes printing instructions that are directly readable by the AM printer. Alternatively, the smooth contour curves and the hatch curves may be stored in an intermediate file format that is readable by the AM printer to be converted into printing instructions.

After receiving the AM printing instructions, the AM printer may sequentially deposit AM material for each of the plurality of layers according to the smooth contour curves and the pluralities of hatch curves to construct the object.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

Embodiments of the invention will now be described with reference to the attached drawings in which:

FIG. 17 illustrates a CLI file utilizing polyline approximations of smooth contour curves from a watertight model to conform to limitations of the polyline file format, according to some embodiments;

Figure 1:
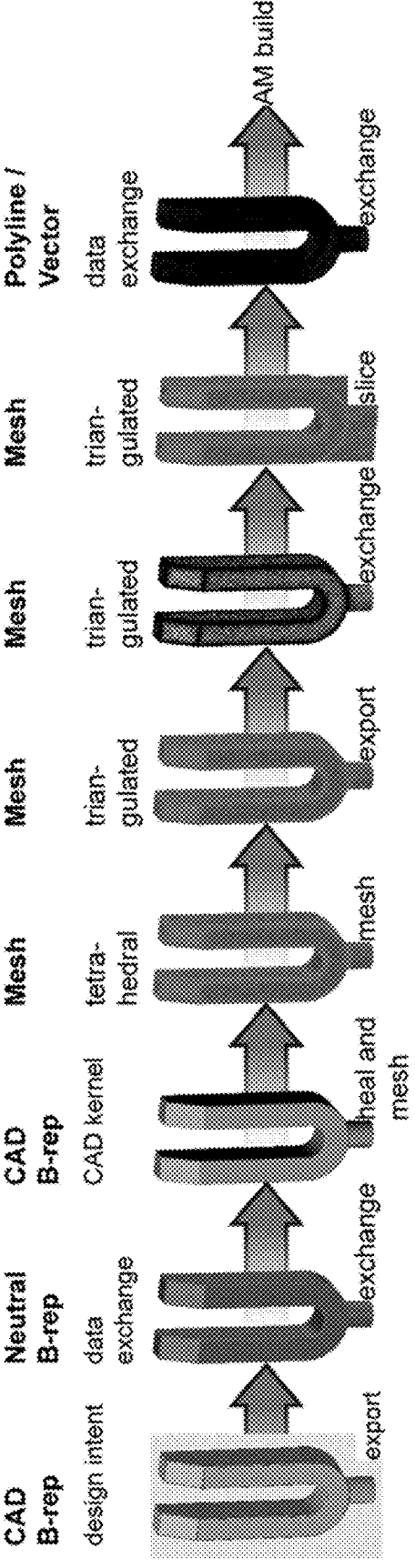
FIG. 1 is an example of modeling representations used in a typical additive manufacturing (AM) workflow, according to the prior art.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION OF THE EMBODIMENTS

Acronyms

Various acronyms are used throughout the present application. Definitions of the most prominently used acronyms that may appear throughout the present application are provided below:

CAD: Computer-Aided Design
BREP: Boundary Representation
NURBS: Non-Uniform Rational B-Spline
SSI: Surface-Surface Intersection
AM: Additive Manufacturing
STL: Stereo Lithography
CLI: Common Layer Interface

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), tablet computer, smart phone, television system, grid computing system, or other device or combinations of devices. In general, the term "computer system" can be broadly defined to encompass any device (or combination of devices) having at least one processor that executes instructions from a memory medium.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Detailed Description

Computer-Aided Design (CAD) Systems

Modern computer-aided design (CAD) systems provide an environment in which users may create and edit curves and surfaces. The curves may include spline curves such as B-spline curves, or more generally, Non-Uniform Rational B-Spline (NURBS) curves. The surfaces may include tensor product spline surfaces such as B-spline surfaces, or more generally, NURBS surfaces, or even more generally, T-spline surfaces. T-Spline surfaces allow the freedom of having T-junctions in the control net of the surface. Tensor product spline surfaces have certain very desirable properties that make them popular as modeling tools, e.g., properties such as: localized domain of influence of each surface control point on surface geometry; controllable extent of continuity along knot lines; $C^\infty$ smoothness between knot lines; and the ability to represent complex freeform geometry in a discrete manner that is intuitive for the user.

Two significant paradigms within computer-aided design with regards to the geometric modeling of an object are surface modeling and solid modeling.

In surface modeling, an object is represented simply as a set of unconnected surfaces, without maintaining a model of the topological structure corresponding to the relationships between the geometric features of the object. Thus, while the user may design two trimmed surfaces within an object that apparently intersect along a given curve, the CAD system does not explicitly record the topological or geometric relationship between the trimmed surfaces. Thus, in surface modeling, surfaces are operated on as independent entities.

In solid modeling, which is utilized for AM applications, the specification of an object requires the specification of both topology and geometry, which are captured in a data structure referred to as a boundary representation (Brep, B-rep, b-rep or brep). From the topological point of view, a boundary representation may include faces, edges and vertices, as well as information regarding their interconnectivity and orientation, among other possibilities. (e.g., An object includes a set of faces. Each face is bounded by a set of edges. Each edge is bounded by a pair of vertices.) From the geometric point of view, the boundary representation may include surfaces, curves and points, which correspond respectively to the faces, edges and vertices of the topological point of view. Thus, a boundary representation provides a way to store and operate on a collection of surfaces, curves and points as a unified object. In addition to faces, edges and vertices, many solid modelers provide additional objects to this data structure, such as loops, shells, half-edges, etc.

CAD Modeling for Additive Manufacturing

Additive Manufacturing (AM), also referred to as Additive Printing or 3D printing may be accomplished by a variety of techniques, including but not limited to: powder bed fusion (laser powder bed fusion, electron beam powder bed fusion, selective laser melting, selective laser sintering, direct metal laser sintering), direct energy deposition (DED) (laser DED, arc DED, electron beam DED), binder jetting, sheet lamination (ultrasonic, friction stir, laminated object manufacturing), material extrusion, material jetting, and vat photopolymerization. These processes may utilize a variety of materials including but not limited to, metals, plastics, clay, concrete, sand, glass, ceramics, polymers, resins/epoxies, and composites.

In some current implementations, native CAD models are not directly suitable for many downstream digital engineering applications, including simulation, additive manufacturing, post-processing, and inspection. Derivative models may be generated to accommodate these downstream applications, typically derived from a neutral file format, such as the ISO 10303 standard (STEP). However, in some current implementations both the native CAD model and the derivative models include mathematical inconsistencies, such as non-geometric watertightness, that may create problems for downstream users. This may be a result of inaccuracy of computing complex intersections of the surfaces (e.g., non-uniform rational basis splines (NURBS) or other types of surfaces) used in boundary representations (B-reps), the modeling description often utilized by modern CAD systems. Because of this, surface intersections may be represented as curve approximations. Thus, while CAD B-rep definitions of geometry are topologically watertight (i.e., they are valid solid models), gaps of geometric discontinuity may be introduced at these approximated intersections that do not allow them to be geometrically watertight.

Consequently, extensive healing, geometric simplification, and the creation of additional faceted polygonal mesh derivatives are typically used in downstream engineering applications, in particular in AM, where geometric watertightness is an important model parameter. An example of a typical AM workflow is illustrated in FIG. 1, according to the prior art. Costs result from the creation of these derivative models in terms of computational labor (as these healing, simplification, derivative creation tasks are often labor intensive) and in the loss of design intent information (e.g., due to making approximations of the original geometry in the derivative models).

Embodiments herein utilize a geometrically watertight CAD model constructed of spline surfaces to offer notable advantages to conventional AM processes. First, it eliminates many downstream model representations and conversions, such as conversion from a CAD model to an approximate tessellated surface. Next, preparing geometric slice data for AM printing directly from the watertight model may be accomplished through providing the AM machine with smooth spline descriptions of the geometry to be printed, resulting in highly precise representations with a lightweight computer memory storage footprint. In various embodiments, this may be performed either by writing a software file that communicates directly with the machine controller or by writing the information to an intermediate file format for the AM machine to read in, convert, and interpret. Embodiments herein present novel and valuable approaches for generating such accurate information for use in AM from input watertight CAD models.

Existing AM workflows add additional steps in between receiving modelling data in a CAD system and sending instructions to an AM printer, many of which are related to healing and meshing models for use in AM printing. The transformations generally take a model from a native CAD model to a neutral data exchange file, then through a series of repair, healing, and meshing steps to create a tessellated model. Some CAD systems perform these steps internally, but the process is often similar with the same resulting file type and quality.

The resulting tessellated model may undergo further additional repair and healing and other modifications made in an AM build prep software, and 2D polyline slices may be created from the tessellated model in a format readable by the AM machine. These polyline slices may be used by the AM printer to guide the machine in building parts. The polylines are referred to as contours or boundaries, with several being offset internally to the part from the outer surface for use by the machine in defining the part edge. Hatch vectors may also be created in these slices as hatched sets of lines for use in printing the internal portion of the part.

Figure 2:
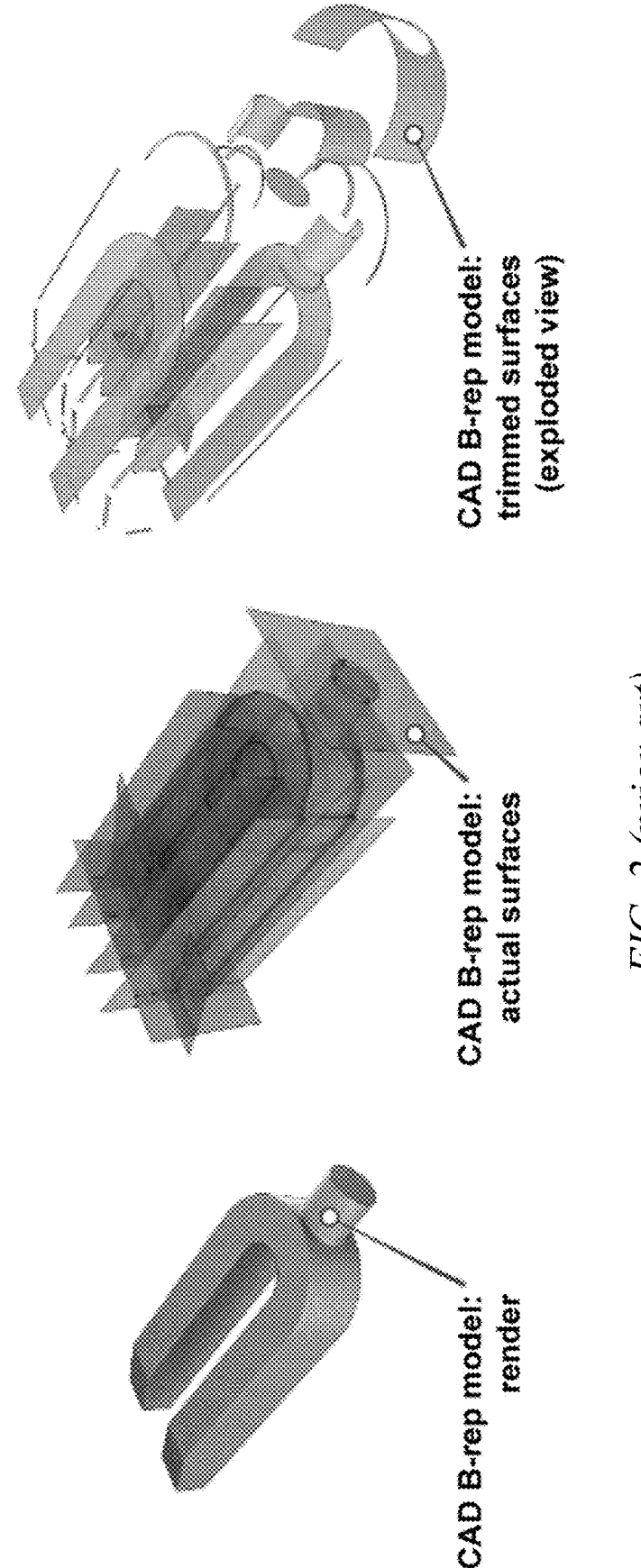
FIG. 2 illustrates a non-watertight boundary representation (B-rep) model showing trimmed surface gaps, according to the prior art.
Figure 3:
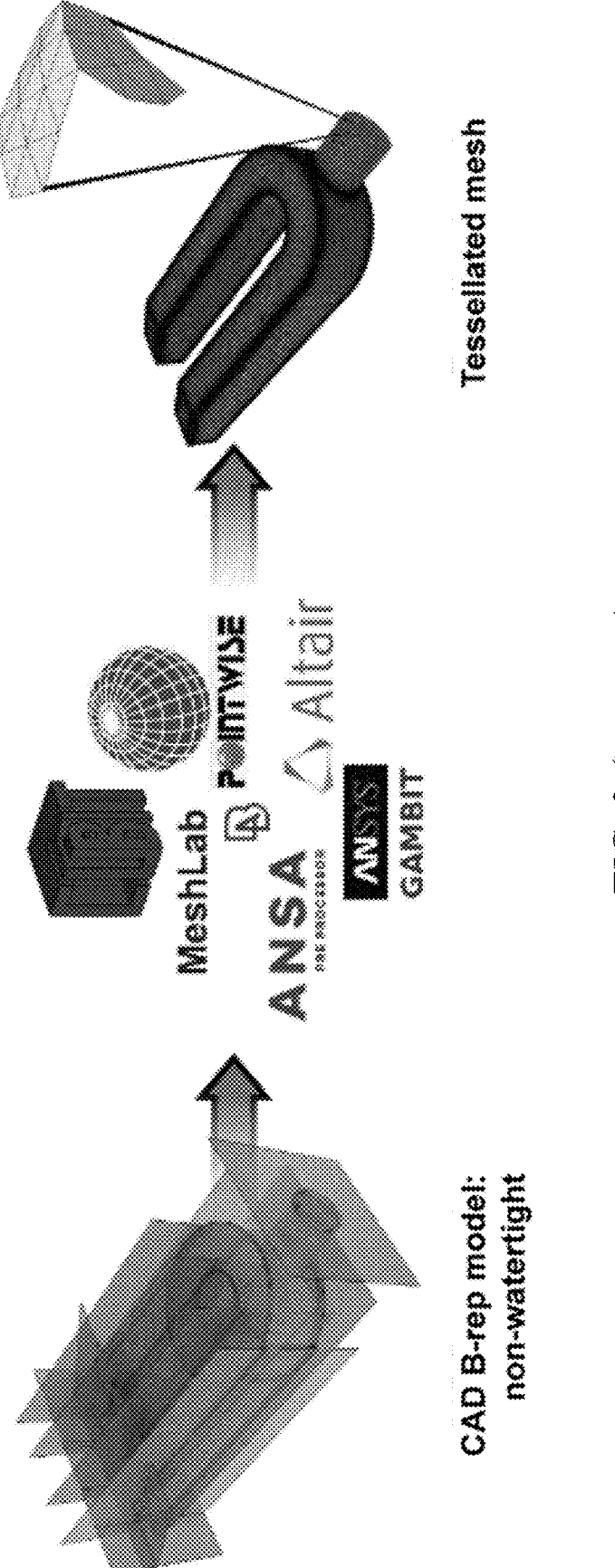
FIG. 3 illustrates model conversion from a B-rep model to a tessellated surface mesh, according to the prior art.

These model conversion, meshing, and healing steps exist due to the way a model is constructed in standard CAD packages. The model you see in a CAD application is built out of primitive shapes such as planes, spheres, cones, or freeform Non-Uniform Rational B-Spline (NURBS) patches. The primitive shapes are "trimmed" to define which portions of the primitive shapes should be visible in the final object. As a result, hundreds of geometric "pieces" are stitched together to make the final model, as shown in FIG. 2. Because of computational limitations, the trimmed surfaces are joined imperfectly and have gaps between them. These gaps are what prevents the model from being used directly by a printer—the printer doesn't know where to go if it encounters a gap. The workaround to this problem is to essentially cover the model with an approximated mesh representation that bridges over the gaps and creates a single closed surface that's suitable for slicing and sending to a printer, as shown in FIG. 3. Standard CAD B-rep model representations are not geometrically watertight and thus not directly suitable for use in AM. Accordingly, a tessellated mesh model is created based on the CAD B-rep model which is structurally suitable for slicing.

Figure 4:
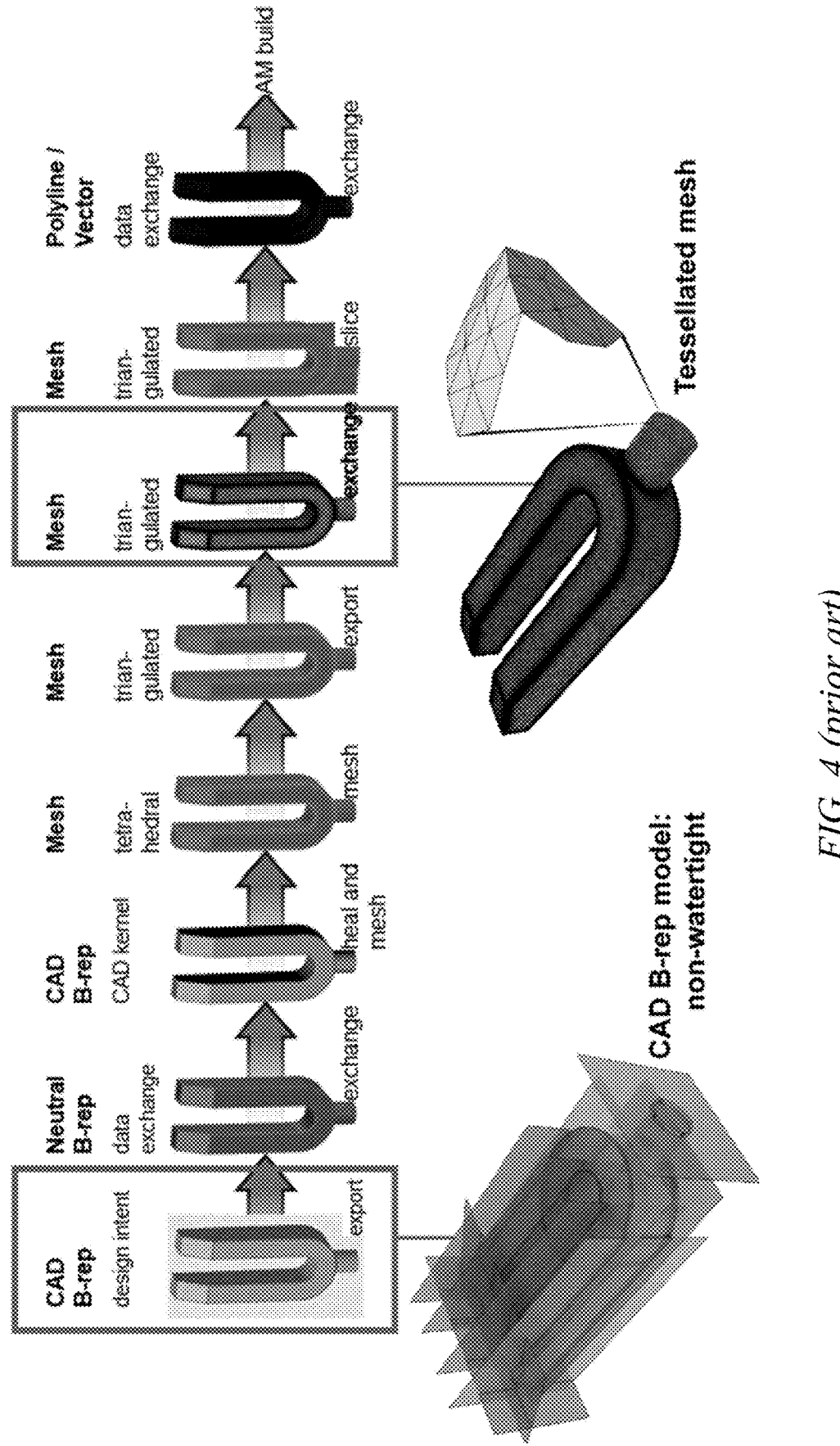
FIG. 4 illustrates model representations and associated issues in a typical AM workflow, according to the prior art.

These conventional AM workflows have adapted to deal with gaps in CAD models, thus introducing many additional steps, processes, and modeling artifacts. The CAD design model, which by construction has gaps between the trimmed surfaces, is healed so that the model can be interpreted by the AM printer, thus introducing additional steps in the middle of the workflow. FIG. 4 illustrates where both a non-watertight CAD B-rep model and a tessellated mesh model may enter a typical AM workflow.

The steps between the CAD model format and the slice file create three major problems: they increase the time and effort needed to send a model to a printer, they decrease the accuracy and precision of the design model, and they increase the file size, file formats, and number of derivative models in the AM pipeline. The following description expands on these three issues.

First, meshing is error prone and time consuming. Although there are automated algorithms that reduce some of this workload, most of the time manual labor is still utilized to check the results or perform additional healing actions. Meshing often involves human intervention, as it is semi-automated but still involves specific application of expert knowledge.

Second, meshing and tessellations reduce the accuracy and precision of the CAD design model. The most evident way model accuracy is reduced is by replacing the smooth surfaces of the CAD geometry with triangular patches. While the facets may be made smaller to improve accuracy, this happens at the expense of file size which can rapidly grow.

The third problem is that meshing creates large file sizes, multiple file formats, and derivative models. The design intent of the geometric description is often altered or changed in translation, and the creation of additional derivative models results in significant representational losses that may be difficult to track.

Given these and other problems, it is often misunderstood why the slice files used for AM printing may not be taken directly from the native trimmed b-rep CAD model. It turns out that while slicing the model is possible, the problems associated with trimmed CAD models just get pushed further downstream. The gaps that exist in the 3D model are transferred over to the 2D slices, so a scheme is typically utilized for healing those gaps. In addition, each segment of the slice is defined by a different underlying primitive shape.

Trying to resolve and transmit these varied geometric descriptions to the printer becomes complicated and messy. In contrast, embodiments herein utilize a watertight spline model that is sliced, such that a smooth, continuous spline description may be created wherein the resulting contours have no gaps, are not faceted approximations, and have descriptions that are efficient for storage in memory.

Figure 5:
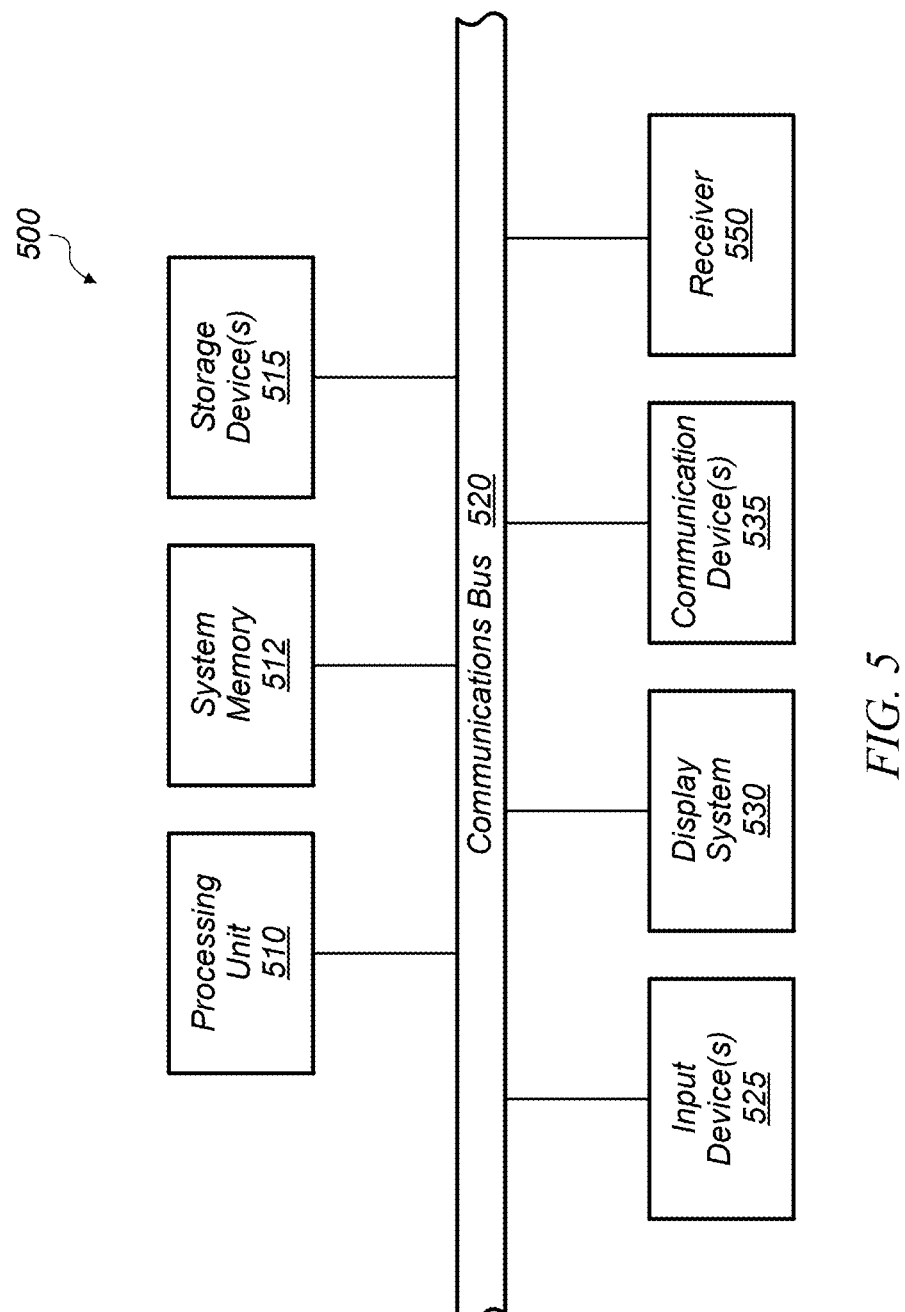
FIG. 5 is an illustration of an exemplary computer system that may be used to perform any of the method embodiments described herein, according to some embodiments.

FIG. 5: Computer System

FIG. 5 illustrates one embodiment of a computer system 500 that may be used to perform any of the method embodiments described herein, or, any combination of the method embodiments described herein, or any subset of any of the method embodiments described herein, or, any combination of such subsets.

In some embodiments, a hardware device (e.g., an integrated circuit, or a system of integrated circuits, or a programmable hardware element, or a system of programmable hardware elements, or a processor, or a system of interconnected processors or processor cores) may be configured based on FIG. 5 or portions thereof. Any hardware device according to FIG. 5 may also include memory as well as interface circuitry (enabling external processing agents to interface with the hardware device).

Computer system 500 may include a processing unit 510, a system memory 512, a set 515 of one or more storage devices, a communication bus 520, a set 525 of input devices, and a display system 530.

System memory 512 may include a set of semiconductor devices such as RAM devices (and perhaps also a set of ROM devices).

Storage devices 515 may include any of various storage devices such as one or more memory media and/or memory access devices. For example, storage devices 515 may include devices such as a CD/DVD-ROM drive, a hard disk, a magnetic disk drive, a magnetic tape drive, semiconductor-based memory, etc.

Processing unit 510 is configured to read and execute program instructions, e.g., program instructions stored in system memory 512 and/or on one or more of the storage devices 515. Processing unit 510 may couple to system memory 512 through communication bus 520 (or through a system of interconnected busses, or through a computer network). The program instructions configure the computer system 500 to implement a method, e.g., any of the method embodiments described herein, or, any combination of the method embodiments described herein, or, any subset of any of the method embodiments described herein, or any combination of such subsets.

Processing unit 510 may include one or more processors or processing elements configured to execute program instructions stored in memory to perform methods of the described embodiments. In some embodiments the processing unit 510 may be a programmable hardware element that may be utilized to perform the described methods. A programable hardware element may include various hardware devices comprising multiple programmable function blocks connected via a programmable interconnect. Examples include field programmable gate arrays (FPGAs), programmable logic devices (PLDs), field programmable object arrays (FPOAs) and complex PLDs (CPLDs). The programmable function blocks may range from fine grained (combinatorial logic or look up tables) to coarse grained (arithmetic logic units, graphics processing units (GPUs), or processor cores). A programmable hardware element may also be referred to as "reconfigurable logic". As another option, an integrated circuit with dedicated hardware components such as an application specific integrated circuit (ASIC) may be used to perform the methods described herein.

One or more users may supply input to the computer system 500 through the input devices 525. Input devices 525 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), an accelerometer (or set of accelerometers), or any combination thereof.

The display system 530 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 500 may include other devices, e.g., devices such as one or more graphics devices (e.g., graphics accelerators), one or more speakers, a sound card, a video camera and a video card, a data acquisition system.

In some embodiments, computer system 500 may include one or more communication devices 535, e.g., a network interface card for interfacing with a computer network (e.g., the Internet). As another example, the communication device 535 may include one or more specialized interfaces for communication via any of a variety of established communication standards or protocols or physical transmission media.

The computer system 500 may be configured with a software infrastructure including an operating system, and perhaps also, one or more graphics APIs (such as OpenGL®, Direct3D, Java 3D™).

Any of the various embodiments described herein may be realized in any of various forms, e.g., as a computer-implemented method, as a computer-readable memory medium, as a computer system, etc. A system may be realized by one or more custom-designed hardware devices such as ASICs, by one or more programmable hardware elements such as FPGAs, by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a computer embedded in a living organism, etc.

Geometrically Watertight CAD Spine Models for Additive Manufacturing

Figure 6:
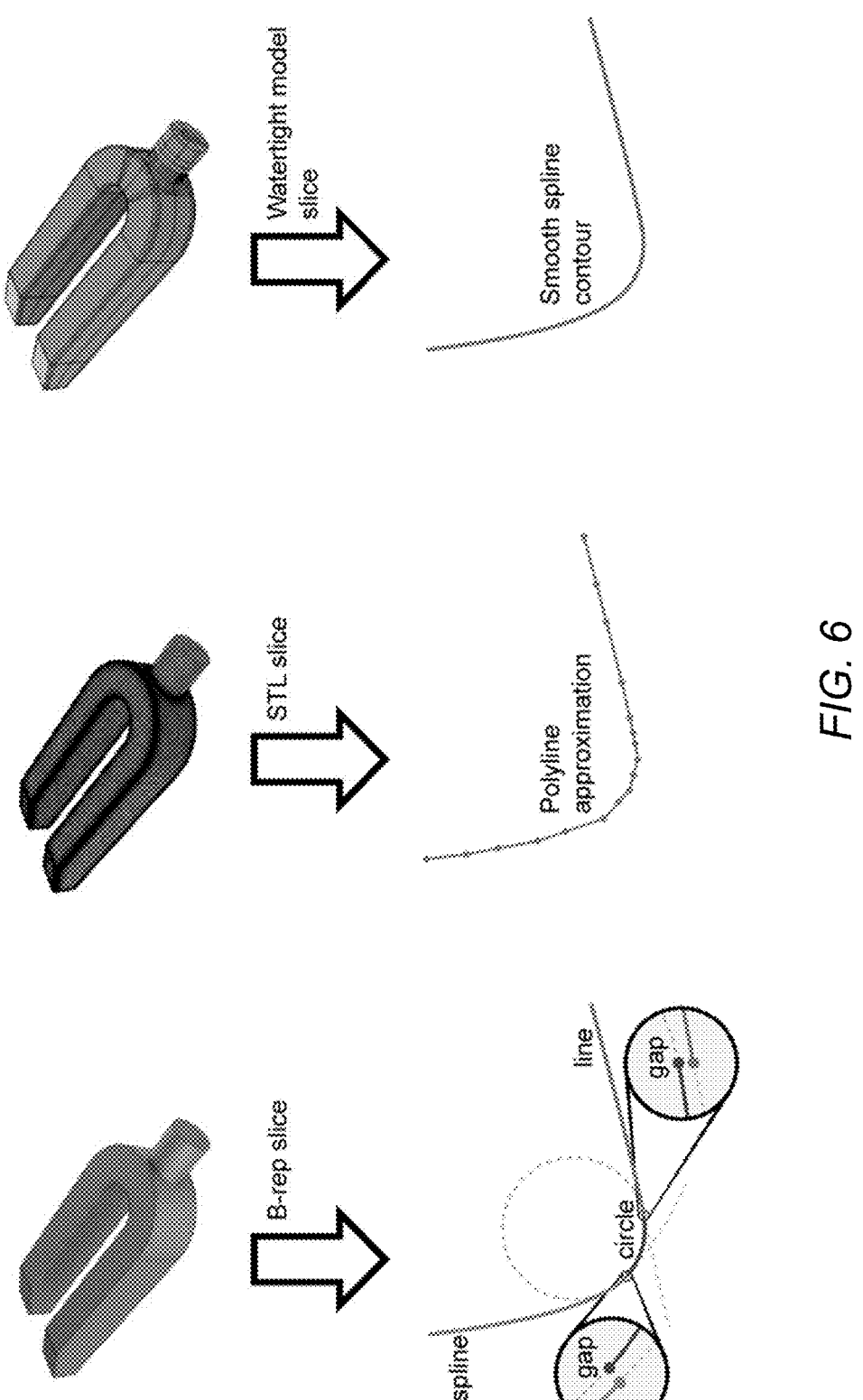
FIG. 6 illustrates a comparison of contours created from slice planes through B-rep, tessellated mesh, and watertight computer-aided design (CAD) models, according to some embodiments.
Figure 7:
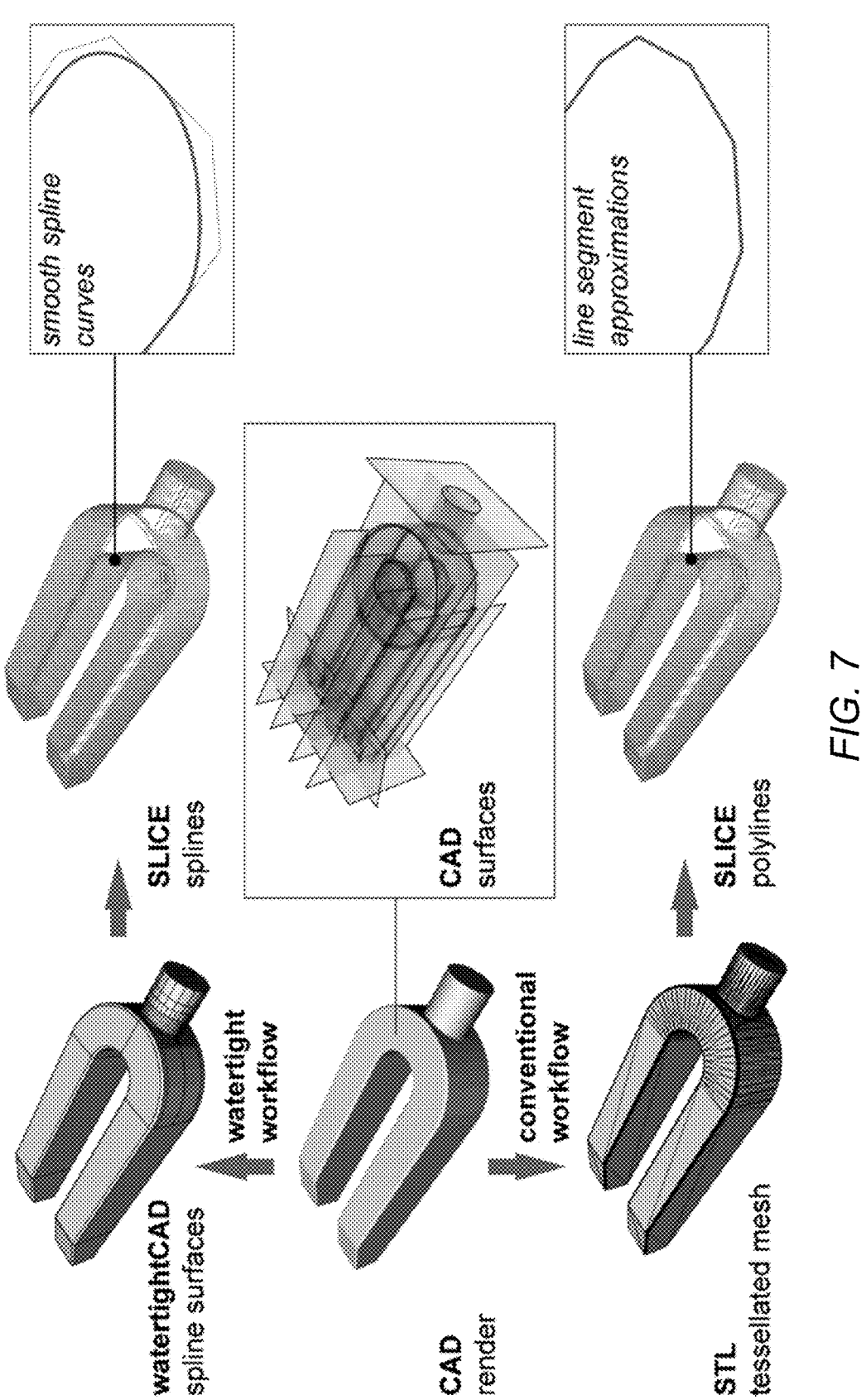
FIG. 7 illustrates a comparison of different boundary slice contour workflows, according to some embodiments.

Embodiments herein present methods and computer systems for utilizing a watertight CAD model for an additive manufacturing (AM) workflow, which offer notable advantages over conventional processes. Because the watertight model is spline-based, AM may be performed without first converting the CAD model to a tessellated mesh model to make it watertight (e.g., a STereoLithography (STL) file), thereby eliminating computationally burdensome steps from a conventional AM workflow. Embodiments herein utilize a watertight CAD model and a slicing plane as input. In exemplary embodiments, the watertight CAD model is sliced to produce a contour consisting of smooth spline curves (as opposed to polylines in some current implementations) that represents the boundary of the object at the slice plane. FIG. 6 illustrates distinctions between a gapped B-rep slice, a STL slice that results in a polyline approximation, and a smooth spline contour produced according to some embodiments. FIG. 7 schematically illustrates two workflows to produce either a smooth spline contour slice or a polyline slice from a CAD model, in some embodiments.

Figure 8:
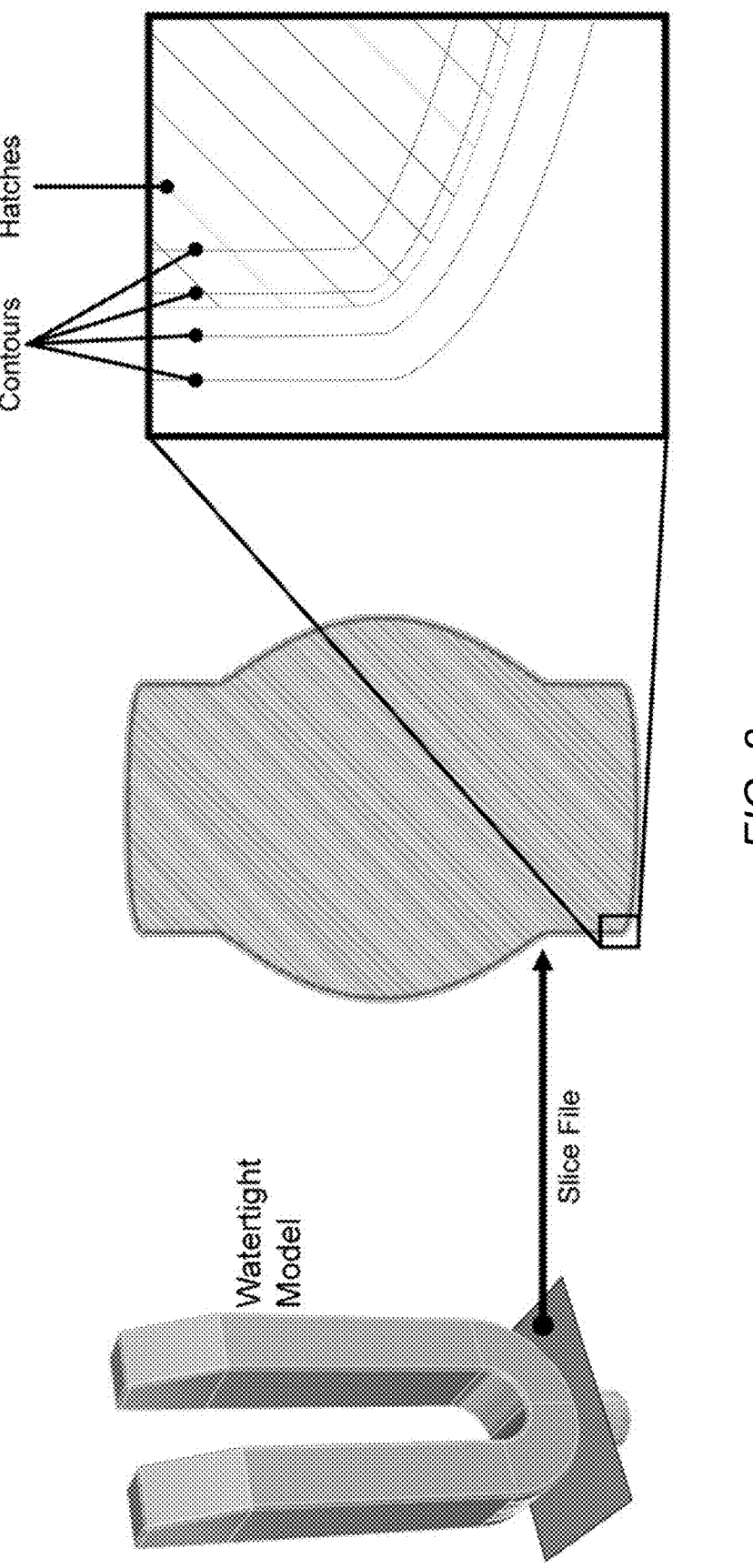
FIG. 8 illustrates slice contours and hatch vectors for a layer of an object, according to some embodiments.
Figure 9:
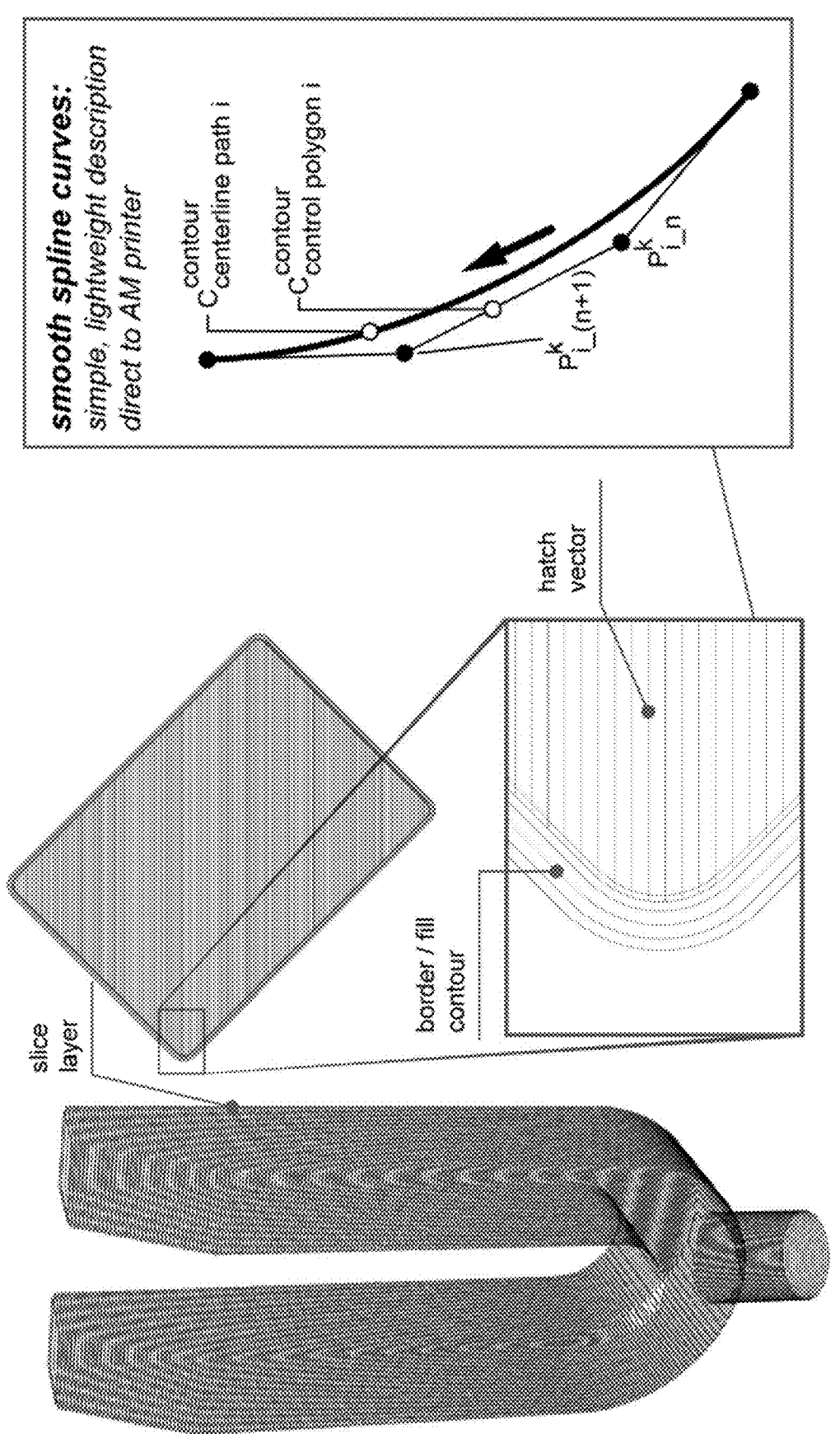
FIG. 9 is another illustration of slice contours and hatch vectors for an object, according to some embodiments.

The interior of the contour is then filled with hatch lines based on the specifications of the AM machine. Additionally, in some embodiments the process may compute one or more offset curves based on the boundary contour curve. These offset curves may be computed at distances determined based on the specifications of the AM machine. The spline-based contours allow determination of precise or exact contour offsets used directly at the boundaries as well as for determining precise or exact hatch extents. The resulting contours, offset curves, and hatch curves are stored in a non-volatile medium for transmission to the AM machine. FIG. 8 illustrates spline contours and hatch curves for a particular layer of an object, according to some embodiments. FIG. 9 is another illustration of spline contours and hatch curves for another layer of the object, according to some embodiments.

Note that embodiments herein are not limited to NURBS CAD models. Any other higher-order spline-based geometric model may also be processed, including T-spline models, S-spline models, U-spline models, subdivision (Sub-D) surface models, or non-rational B-spline models, in various embodiments.

Because the contours and hatch curves are modeled as higher order geometry, the AM machine controller may process the geometry directly to obtain velocity and acceleration data, in addition to position data, for directing the AM machine parameters. In current implementations, this higher derivative data (i.e., velocity and acceleration data) is approximated with the linear geometry used in current practice AM processing, whereas embodiments herein provide a more accurate and precise methodology for deriving the higher derivative data.

In some embodiments, the geometric data contained in the watertight CAD model may be converted to a format that is directly usable by the AM machine; specifically, a 2.5D slice file consisting of layers of contour curves and hatch vector paths as polylines or spline curves.

The watertight CAD model slice technique described herein produces smooth contours as splines. The splines are a lightweight description of the geometry and accurate to model tolerance. In various embodiments, this can be performed either by writing a data file with machine commands that are processed directly by the machine controller, or by writing the information to an intermediate file format for the AM machine to read in, convert, and interpret. The intermediate files may contain either exact descriptions of the spline contours and hatch vectors, or polyline approximations of splines of unique construction and relation to the splines that may be controlled and refined to specific tolerances and fidelities.

In some embodiments, the splines and hatch vectors may be sampled at specific intervals or at discrete points and times by the AM printer in an untranslated and direct information workflow, as directed by machine or machine controller instruction.

A unique property to the described embodiments is that metadata related to the AM production of the object received by the AM printer may be directly associated with representational characteristics (e.g., control points, knot intervals, curve domains, etc.) of the smooth contour curves and the hatch curves. This associated metadata may then be utilized to modify the smooth contour curves and hatch curves by spline modification techniques (e.g., control point repositioning, control point weight modification, warping, knot refinement, knot insertion, knot removal, degree elevation, etc.). The modified smooth contour curves and the hatch curves may then be used to modify the geometrically watertight CAD spline model used to initially generate the data as well as the source CAD boundary representation (B-rep) model of the object, if derived from one. The modified smooth contour curves and hatch curves updated through collected metadata can provide valuable feedback to the design, inspection, analysis, and manufacturing domains by informing as-measured and as-built conditions of the printed physical object. In some embodiments, this may be further employed in machine learning (ML) and artificial intelligence (AI) operations that benefit from such high quality and precise information.

Figure 10:
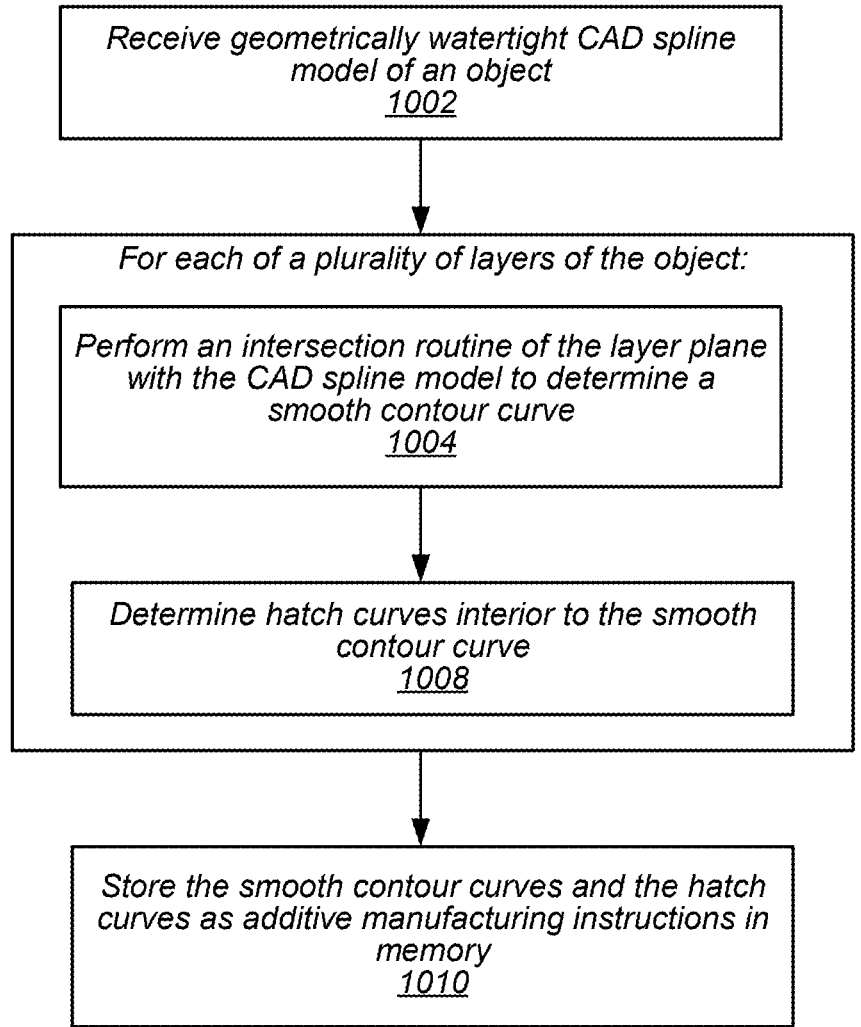
FIG. 10 is a flowchart diagram illustrating a method for constructing AM instructions for 3-D printing of a tangible object using a geometrically watertight CAD spline model, according to some embodiments.

FIG. 10—Flowchart for Performing AM With a Watertight Cad Spline Model

FIG. 10 is a flowchart diagram illustrating a method for constructing and utilizing AM instructions for 3-D printing of a tangible object using a geometrically watertight CAD spline model, according to some embodiments.

At 1002, a geometrically watertight computer-aided design (CAD) spline model of a physical object is received. In various embodiments, the geometrically watertight CAD spline model may be a non-uniform rational basis spline (NURBS) model, a T-spline model, an S-spline model, a U-spline model, a subdivision (Sub-D) surface model, or a basis spline (B-spline) model. The physical object may be any of a variety of types of objects that are printable by an AM printer. The geometrically watertight CAD spline model may be a CAD spline model that represents the entire outer surface(s) and/or inner surface(s) of the physical object. For example, the physical object may have internal gaps or voids, in which case the geometrically watertight CAD spline model may include these inner surfaces as well as the external-facing surface(s). In other words, the geometrically watertight CAD spline model represents the entirety of the boundary or boundaries of the physical object.

Steps 1004 and 1006 may be performed, sequentially or in parallel, for each of a plurality of respective layers of the object. The layers are parallel and stacked, and represent the sequential layers of AM deposition for printing the physical object. In some embodiments, the distance between adjacent layers of the object may be received from an AM printer. The distance between adjacent layers may be constant or variable between different layers, according to the specifications of the AM printer.

At 1004, for a particular respective layer, an intersection routine is performed of the plane of the respective layer with the geometrically watertight CAD spline model to determine a respective smooth contour curve. In some embodiments, the smooth contour curve for the layer is a spline curve representing an intersection of the plane of the respective layer with the geometrically watertight CAD spline model. For example, the intersection routine may produce a smooth contour curve that traces along the outer perimeter of the object at the respective layer. Note that the object may have interior voids or gaps, and the outer perimeter may include the surfaces of these voids or gaps as well as any external-facing surface(s). Advantageously, the smooth contour curve may be gapless, such that it is suitable to be translated into printing instructions for an AM printer.

In some embodiments, for each layer, one or more respective offset contour curves are determined based on the respective smooth contour curve. The offset contour curves may be at predetermined distances interior to the object from the respective smooth contour curve. For example, depending on the specifications of the AM printer and/or physical specifications of the object to be printed, one or more offset curves that run interior to and along the smooth contour curve may be determined for use in printing the object.

In some embodiments, for each layer, a respective polyline is determined to approximate the smooth contour curves, wherein knot locations in the polylines are selected to reduce a discrepancy between the respective polyline and the respective smooth contour curve. In other words, a polyline may be constructed that approximates the smooth contour curve, which may be more suitable for certain types of AM printers and/or may utilize a smaller memory storage footprint. The polyline may be constructed to satisfy a fault tolerance or resolution of the AM printer and/or precision specification of the object to be printed.

At 1006, for a particular respective layer, a respective plurality of hatch curves for the layer is determined which is interior to the respective smooth contour curve. The hatch curves may be have a variety of forms, including but not limited to straight vectors, curves or complex patterns. The hatch curves may be determined such that they terminate a predetermined distance away from the smooth contour curve of the respective layer. The hatch curves may be determined to fill the interior of the physical object, with their relative separation from each other and the smooth contour curve determined based on parameters and/or specifications of the AM printer. For example, the predetermined distance between the termination of the hatch curves and the smooth contour curve may be received as a predetermined specification from the AM printer.

In some embodiments, a CAD boundary representation (B-rep) model of the object may be determined based at least in part on the geometrically watertight CAD spline model. Alternatively or additionally, the smooth contour curves may be translated into a CAD boundary representation (B-rep) model of the object. One or more physical properties of the object may then be determined based at least in part on the CAD B-rep model and/or the smooth contour curves.

In other words, modelling of physical properties of the object to be printed may be performed based on a CAD B-rep model of the object and the determined smooth contour curves. Advantageously, this modelling process may provide a more accurate description of the object as printed, since it incorporates the smooth contour curves that will be actually used in 3D printing of the object.

In some embodiments, an iterative process may be performed wherein the geometrically watertight CAD spline model is modified based on modelling the physical properties of the object to be printed, and the modified CAD spline model may then be used to derive new smooth contour and hatch curves for printing the object. For example, if the physical modelling determines that the object to be printed (according to the original determined smooth contour and hatch curves) fails to meet desired parameters, this information may be used to modify the geometrically watertight CAD spline model to produce new smooth contour and hatch curves for printing an object that does satisfy any of these various physical properties or specifications.

In some embodiments, metadata is received related to AM production of the object, and the metadata is associated with characteristics of one or both of the smooth contour curves and the hatch curves. Examples of metadata may include laser pulse properties, temperature, humidity, color, etc., that are known to have structural, functional, performance, and/or ornamental effects on the quality of the print.

In some embodiments, additional metadata associated with the smooth contour curves and hatches may be utilized to further enhance printing instructions. This may or may not be metadata obtained by machine feedback, or it may be established by design in a user-defined forward manner. The metadata may further take advantage of the constituent components of the contour and hatch spline definitions, in particular the basis functions, knot vector, control points, degree, etc., in order to tailor the metadata description to the geometric description in the same mathematical sense, thereby taking advantage of the known properties available to splines, such as blending, smoothness, refinement, etc. Attributes that may be conveyed via spline-based metadata include, but are not limited to, material deposition rates, laser powers, material type(s) or gradation(s), colors, etc.

In some embodiments, this metadata information may be used in a predictive manner in the simulation of AM processes to pre-distort geometry for printing and/or in real time as a reactive means of providing updated instructions to the printer based on machine feedback data related to geometric or other relevant properties. More generally, the metadata may be any non-geometric instructions that directs any aspect of the AM printing of the object. The metadata may be utilized to modify one or both of the smooth contour curves and the hatch curves. In addition, in some embodiments one or both of the modified smooth contour curves and the modified hatch curves are utilized to modify the geometrically watertight CAD spline model. In some embodiments, the geometrically watertight CAD spline model is based on a CAD boundary representation (B-rep) model of the object, and one or both of the modified smooth contour curves or the modified hatch curves are used to modify the CAD B-rep model.

At 1008, the smooth contour curves and the pluralities of hatch curves are stored in a non-transitory computer-readable memory medium. In some embodiments, the offset contour curves and/or the polylines that approximate the smooth contour curves may be stored in the memory medium, in addition or alternatively to storing the smooth contour curves.

In some embodiments, the method further comprises providing, to an AM printer, AM printing instructions that are determined based at least in part on the smooth contour curves and the pluralities of hatch curves. For example, the AM printing instructions may be constructed based on the smooth contour curves and the plurality of hatch curves, and may also incorporate specifications and parameters of the AM printer (e.g., accuracy and precision tolerances, sampling resolution, memory capacity, etc.). For example, in some embodiments, a sampling resolution may be received from an AM printer, and the AM printing instructions provided to the AM printer may be determined further based at least in part on the sampling resolution. In some embodiments, the sampling resolution may be used to determine the distance between layers of AM process, a resolution knot location for polylines determined from the smooth contour curves, or higher derivate data used by the AM printer. For example, the AM printing instructions may include position data, velocity data, and/or acceleration data to direct the AM printing procedure, and this data may be determined from the smooth contour curves, the offset curves, and/or the hatch curves. The position data, the velocity data, and/or acceleration data may be directly derived from the smooth contour curves and the hatch curves.

In some embodiments, a software file may be written based at least in part on the smooth contour curves and the hatch curves, where the software file includes printing instructions that are directly readable by the AM printer. Alternatively, the smooth contour curves and the hatch curves may be stored in an intermediate file format that is readable by the AM printer to be converted into printing instructions.

After receiving the AM printing instructions, the AM printer may sequentially deposit AM material for each of the plurality of layers according to the smooth contour curves and the pluralities of hatch curves to construct the object.

Figure 11:
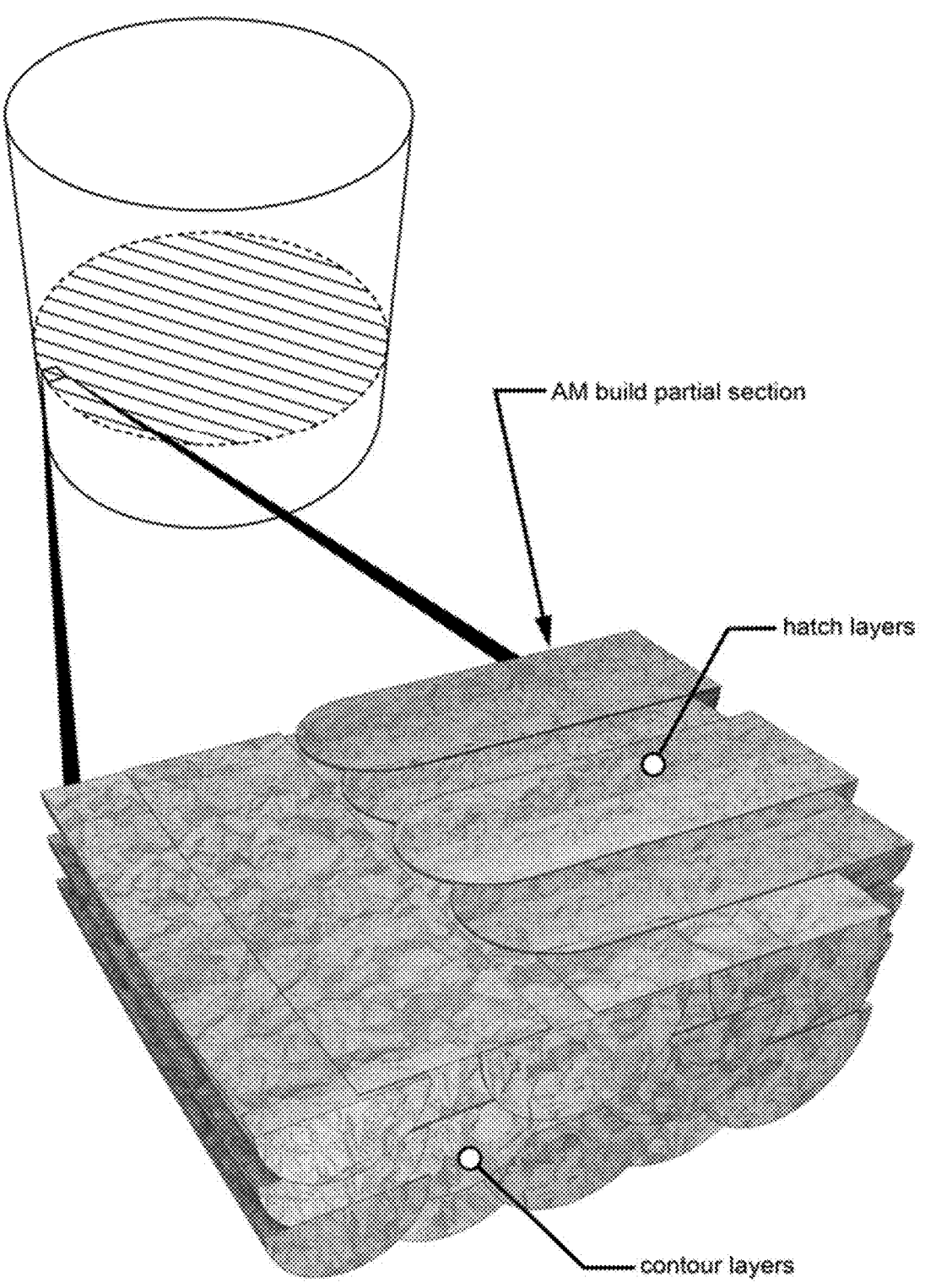
FIG. 11 is a rendered depiction of an idealized AM build partial section, according to some embodiments.

FIGS. 11-9—Additional Description

FIGS. 11-19 provide additional detail and description related to various embodiments described herein. FIG. 11 is a rendering of an AM build partial section of a cylindrical object using idealized melt paths, and illustrates both hatch layers and contour layers, according to some embodiments.

Figure 12:
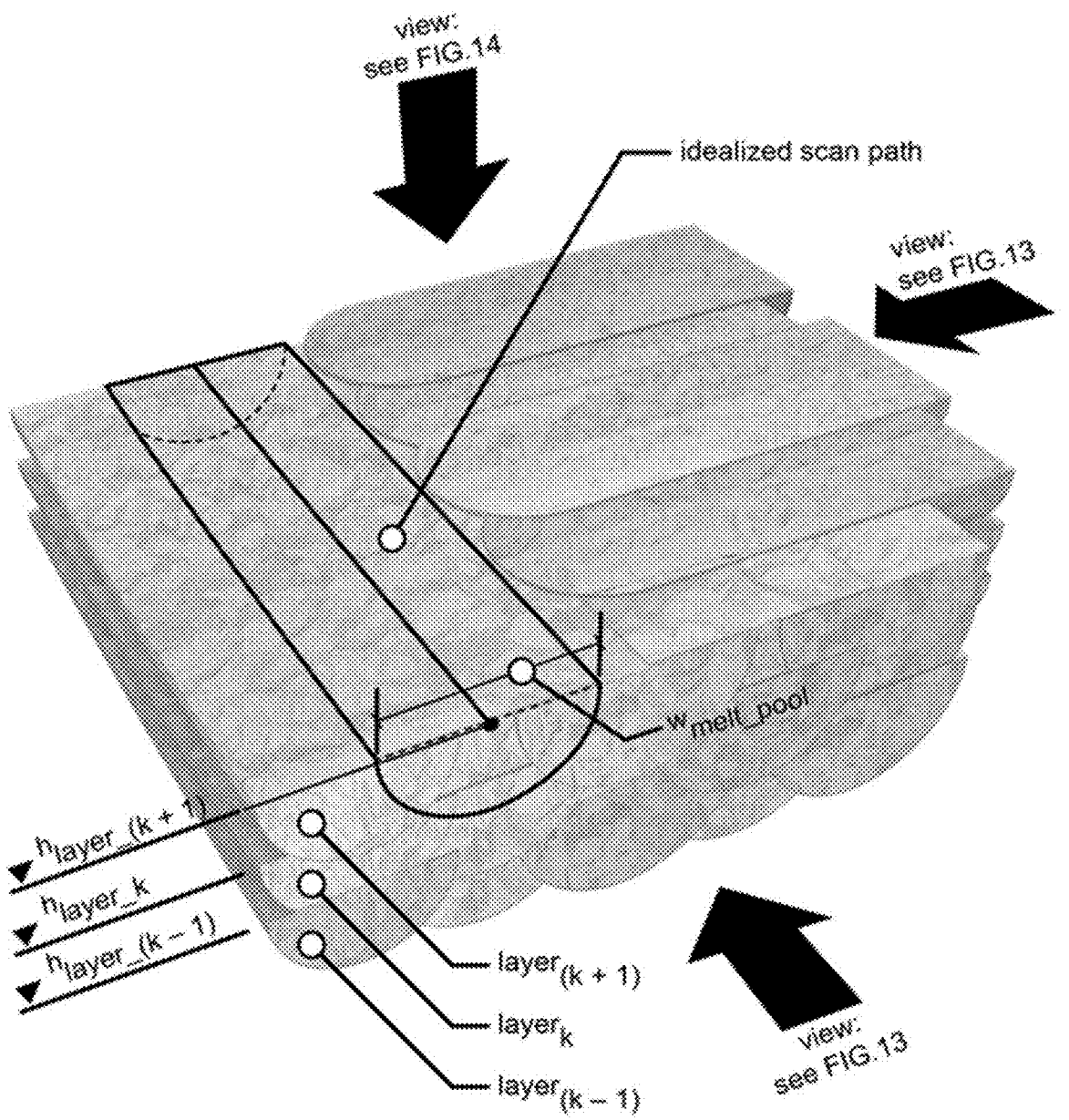
FIG. 12 is a labelled illustration of the rendered depiction shown in FIG. 11, according to some embodiments.

FIG. 12 illustrates the same AM build partial section with more detailed labels for the idealized scan path and different layer components, according to some embodiments.

Figure 13:
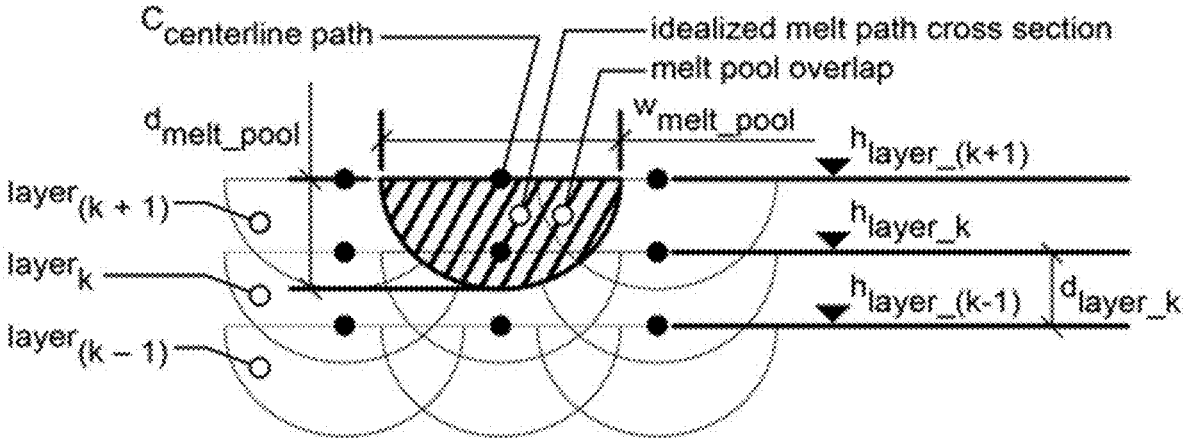
FIG. 13 is a cross-section view of an idealized AM build partial layer, according to some embodiments.

FIG. 13 is a side cross-section view of the idealized AM build partial layer, which more clearly illustrates the melt pool overlap between different spline contours and hatch curves for different layers, according to some embodiments.

Figure 14:
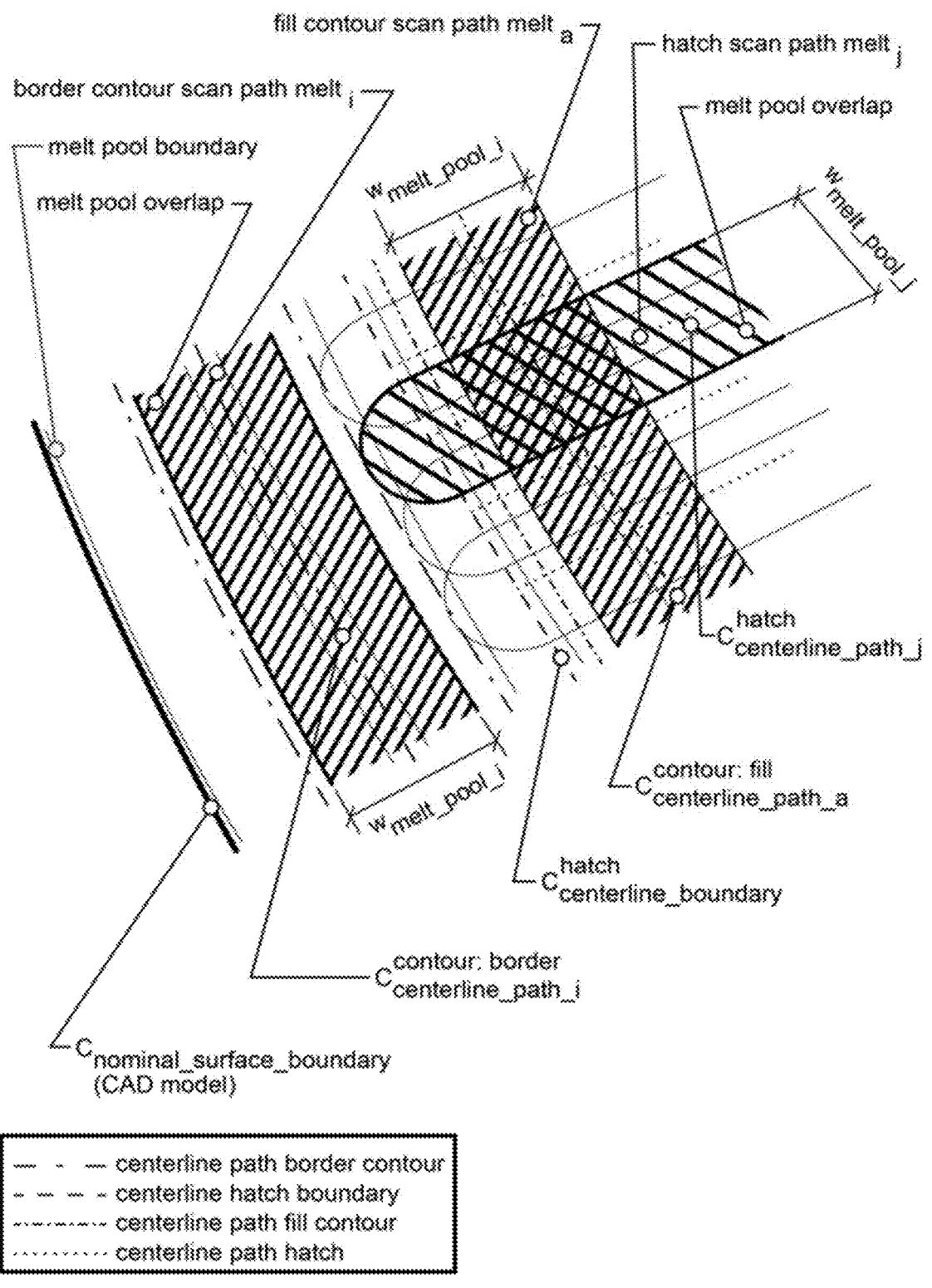
FIG. 14 is a top-down view of an idealized AM partial build layer, according to some embodiments.

FIG. 14 is a top-view of the same idealized AM build partial layer illustrating various aspects of the contour and hatch scan paths, according to some embodiments.

Figure 15:
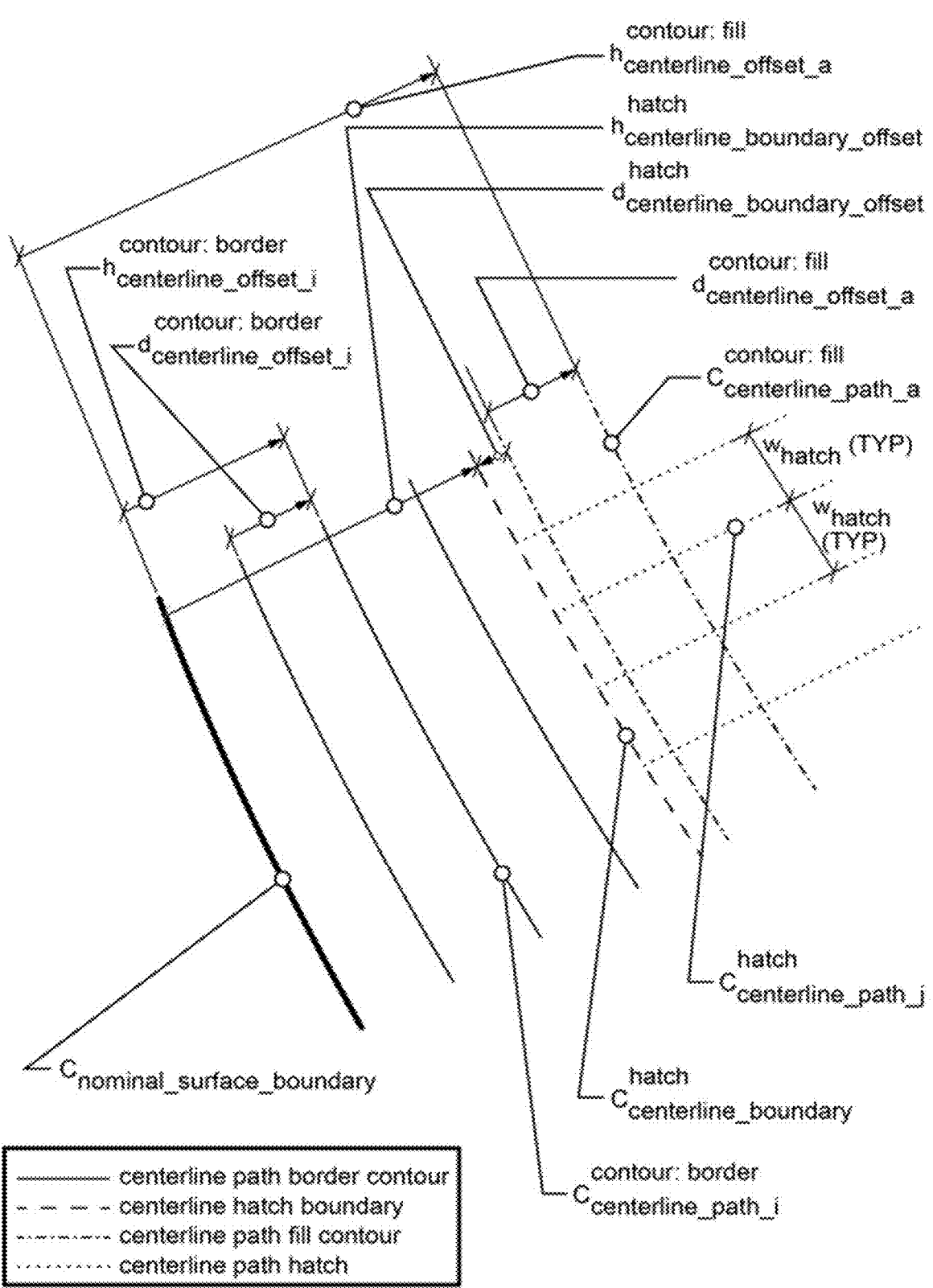
FIG. 15 is a schematic illustration of various parameters of the smooth contour curves and the hatch curves for an idealized AM partial build layer, according to some embodiments.

FIG. 15 is a schematic diagram illustrating various distance parameters for the idealized AM build partial layer, according to some embodiments.

Figure 16:
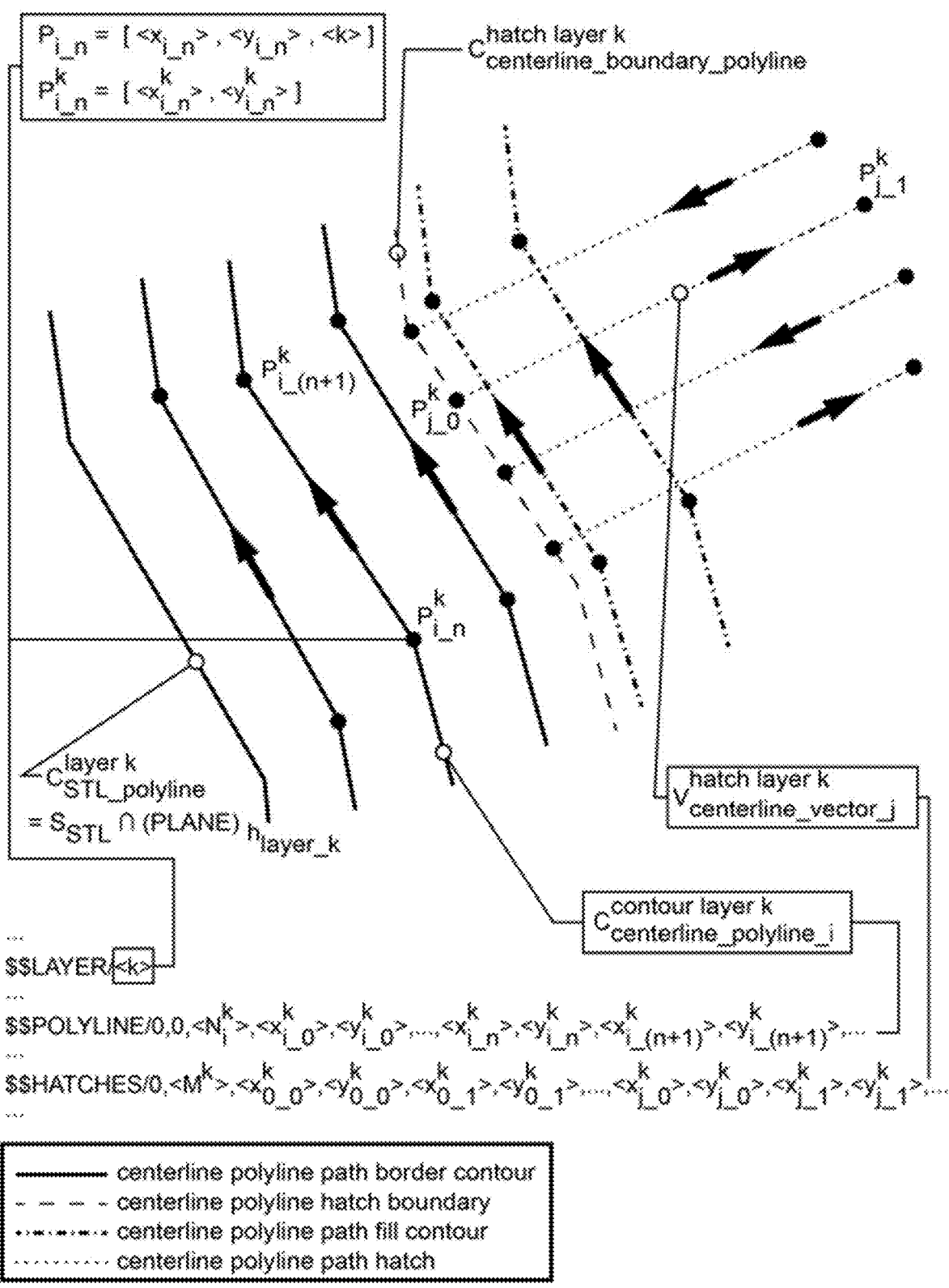
FIG. 16 illustrates a common layer interface (CLI) file utilizing polylines and associated file data produced from an AM workflow, according to some embodiments.

FIG. 16 illustrates a common layer interface (CLI) file utilizing polylines and associated file data produced from an AM workflow, according to some embodiments.

FIG. 17 illustrates a CLI file utilizing polyline approximations of smooth contour curves from a watertight model to conform to limitations of the polyline file format, according to some embodiments.

Figure 18:
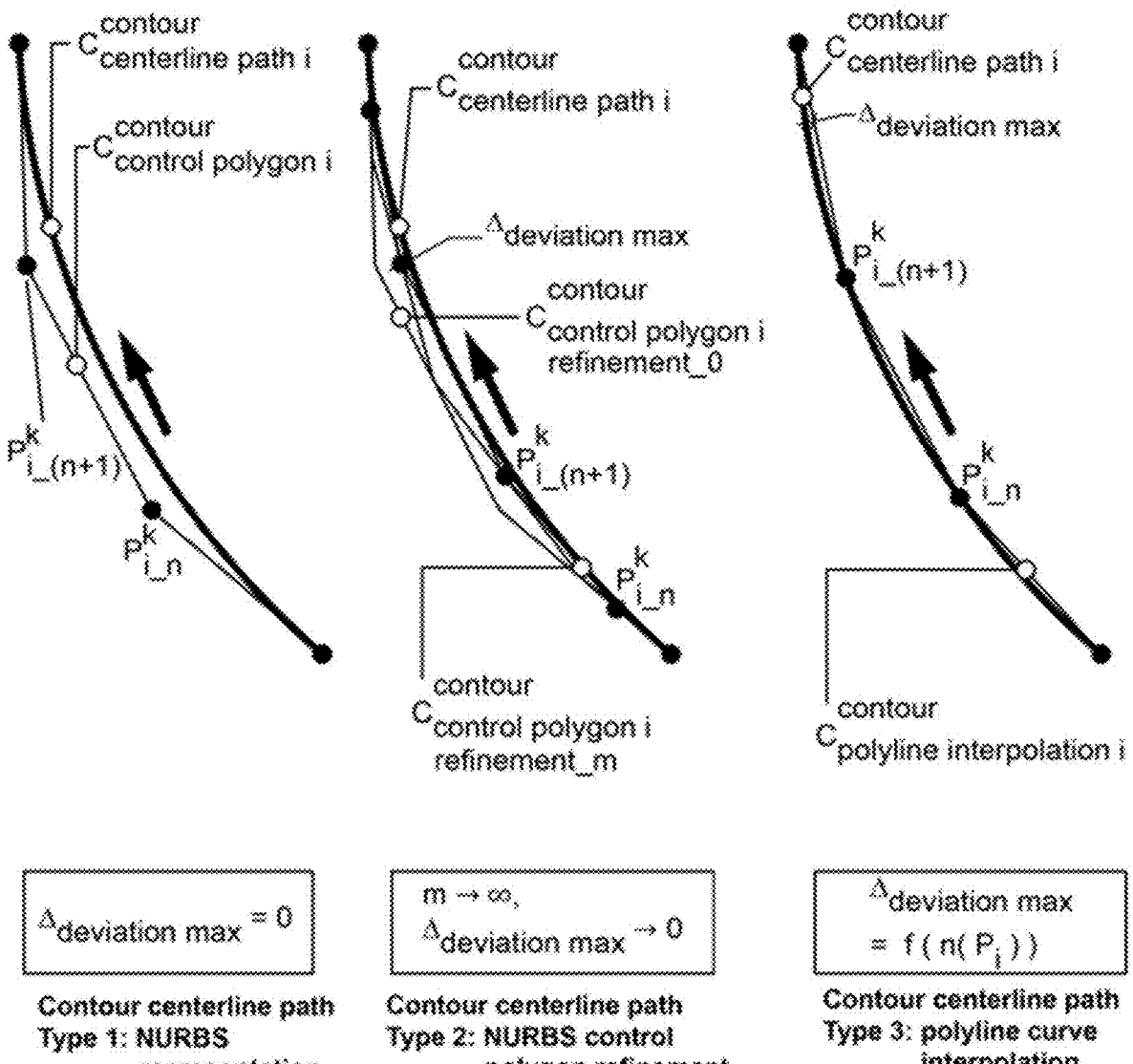
FIG. 18 illustrates linearization of spline contours into polylines, according to some embodiments.

FIG. 18 illustrates linearization of spline contours into polylines, according to some embodiments.

Figure 19:
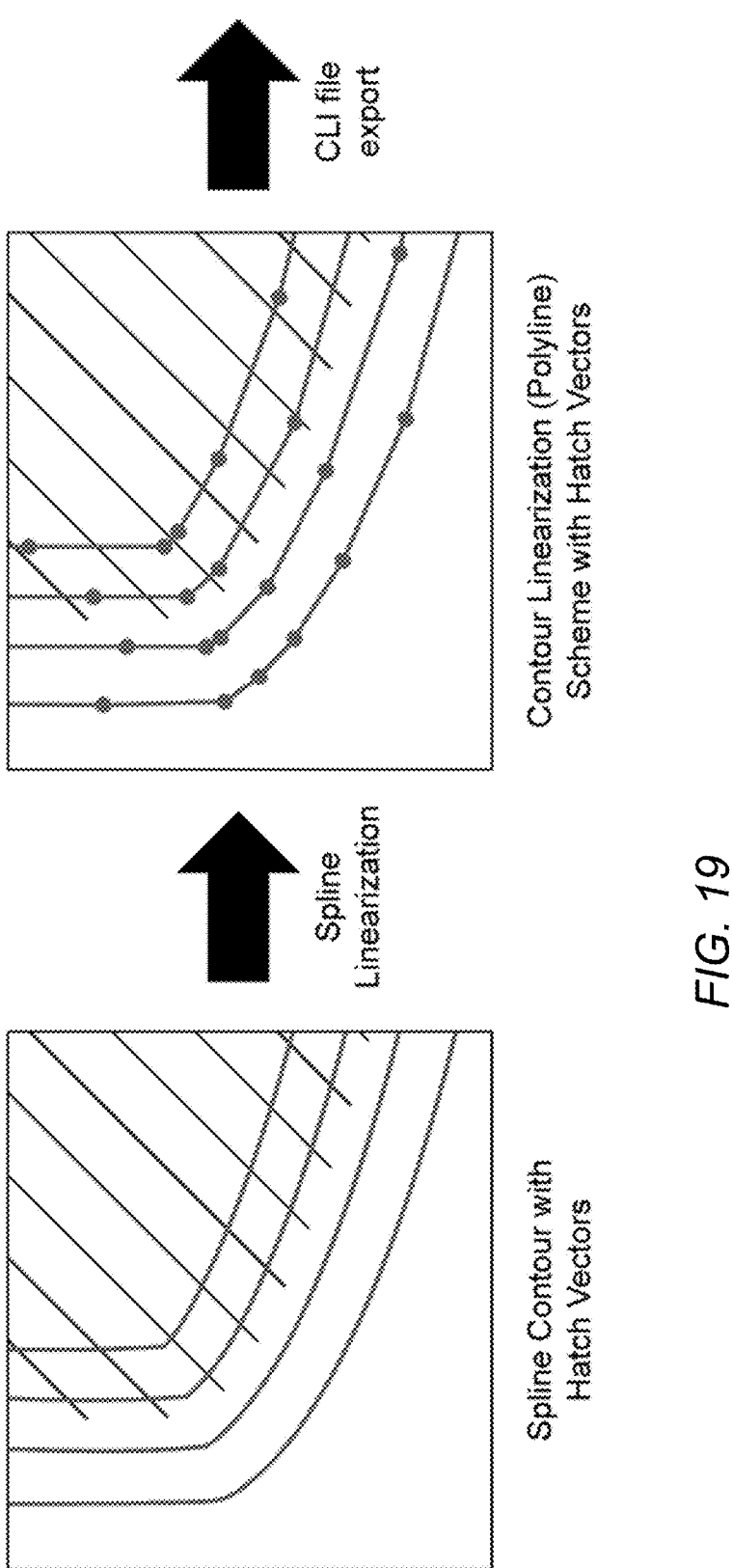
FIG. 19 illustrates a non-uniform rational basis spline (NURBS) representation and polyline interpolation for a smooth contour curve, according to some embodiments.

FIG. 19 illustrates a non-uniform rational basis spline (NURBS) representation and polyline interpolation for a smooth contour curve, according to some embodiments.

Note that various embodiments of the techniques disclosed herein may be implemented in a variety of different ways. For example, the methods described herein may be performed by software executing on a computer system. However, while some embodiments are described in terms of one or more programs executing on a computer, these embodiments are exemplary only, and are not intended to limit the techniques to any particular implementation or platform. Thus, for example, in some embodiments, the techniques may be implemented on or by a functional unit (also referred to herein as a processing element), which may include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-readable memory medium storing program instructions which, when executed by a processor, cause the processor to:

receive a geometrically watertight computer-aided design (CAD) spline model of an object;

for each of a plurality of respective layers of the object:

perform an intersection routine of a respective plane of the layer with the geometrically watertight CAD spline model to directly determine a respective smooth contour curve, wherein, for each of the plurality of respective layers, the smooth contour curve comprises a spline curve representing an intersection of the respective plane of the respective layer with the geometrically watertight CAD spline model; and determine a respective plurality of hatch curves within the respective plane and interior to the respective smooth contour curve;

store the smooth contour curves and the pluralities of hatch curves in the non-transitory computer-readable memory medium; and provide printing instructions to an additive manufacturing (AM) printer to sequentially deposit AM material on each of the plurality of layers according to the smooth contour curves and the pluralities of hatch curves.

2. The non-transitory computer-readable memory medium of claim 1, wherein the program instructions are further executable to cause the processor to:

for each of the plurality of respective layers of the object:

determine a respective polyline to approximate the respective smooth contour curve, wherein knot locations in the respective polyline are selected to reduce a discrepancy between the respective polyline and the respective smooth contour curve; and store the polylines in the non-transitory computer-readable memory medium.

3. The non-transitory computer-readable memory medium of claim 1, wherein the program instructions are further executable to cause the processor to:

determine the AM printing instructions for printing the object based at least in part on the smooth contour curves and the pluralities of hatch curves.

4. The non-transitory computer-readable memory medium of claim 1, wherein the program instructions are further executable to cause the processor to:

receive a sampling resolution from the AM printer; and determine the AM printing instructions for printing the object based at least in part on the sampling resolution, the smooth contour curves and the pluralities of hatch curves.

5. The non-transitory computer-readable memory medium of claim 1, wherein the AM printing instructions comprise one or more of position data, velocity data, and acceleration data, wherein one or more of the position data, the velocity data, and the acceleration data are directly derived from the smooth contour curves and the hatch curves.

6. The non-transitory computer-readable memory medium of claim 1, wherein, for each of the plurality of respective layers of the object:

the respective plurality of hatch curves is determined based at least in part on the respective smooth contour curve, wherein hatch curves of the respective plurality of hatch curves terminate a predetermined distance away from the respective smooth contour curve.

7. The non-transitory computer-readable memory medium of claim 1, wherein the program instructions are further executable to cause the processor to:

receive, from the AM printer, a distance between adjacent layers of the object.

8. The non-transitory computer-readable memory medium of claim 1, wherein the program instructions are further executable to cause the processor to:

determine a CAD boundary representation (B-rep) model of the object based at least in part on the geometrically watertight CAD spline model; and determine one or more physical properties of the object based at least in part on the CAD B-rep model and the smooth contour curves.

9. The non-transitory computer-readable memory medium of claim 1, wherein the smooth contour curves are translatable into a CAD boundary representation (B-rep) model of the object.

10. The non-transitory computer-readable memory medium of claim 1, wherein the geometrically watertight CAD spline model comprises one of:

a non-uniform rational basis spline (NURBS) model;

a T-spline model;

an S-spline model;

a U-spline model;

a subdivision (Sub-D) surface model; or a basis spline (B-spline) model.

11. The non-transitory computer-readable memory medium of claim 1, wherein the program instructions are further executable to cause the processor to:

for each of the plurality of respective layers of the object:

determine one or more respective offset contour curves based at least in part on a respective smooth contour curve of the respective layer, wherein the respective offset contour curves are at predetermined distances interior to the object from the respective smooth contour curve.

12. The non-transitory computer-readable memory medium of claim 1, wherein the program instructions are further executable to cause the processor to:

receive metadata related to AM production of the object; and associate the metadata with characteristics of one or both of the smooth contour curves and the hatch curves.

13. The non-transitory computer-readable memory medium of claim 12, wherein the program instructions are further executable to cause the processor to:

utilize the metadata to modify one or both of the smooth contour curves and the hatch curves.

14. The non-transitory computer-readable memory medium of claim 13, wherein the program instructions are further executable to cause the processor to:

utilize one or both of the modified smooth contour curves and the hatch curves to modify the geometrically watertight CAD spline model.

15. The non-transitory computer-readable memory medium of claim 13, wherein the geometrically watertight CAD spline model is based on a CAD boundary representation (B-rep) model of the object, wherein the program instructions are further executable to cause the processor to:

utilize one or both of the modified smooth contour curves or the modified hatch curves to modify the CAD B-rep model.

16. The non-transitory computer-readable memory medium of claim 1, wherein the program instructions are further executable to cause the processor to:

write a software file based at least in part on the smooth contour curves and the hatch curves, wherein the software file comprises printing instructions that are directly readable by an AM printer, or store the smooth contour curves and the hatch curves in an intermediate file format that is readable by the AM printer to be converted into the printing instructions.

17. The non-transitory computer-readable memory medium of claim 1, wherein the smooth contour curves are gapless.

18. The non-transitory computer-readable memory medium of claim 1, wherein the AM printer operates by utilizing one of:

laser or electron beam powder bed fusion selective laser melting, selective laser sintering, direct metal laser sintering, laser, arc, or electron beam direct energy deposition (DED), binder jetting, sheet lamination, material extrusion, material jetting, or vat photopolymerization.

19. The non-transitory computer-readable memory medium of claim 1, wherein the AM material comprises one or more of a metal, plastic, clay, concrete, sand, glass, ceramic, polymer, resin, epoxy, and composite material.

20. A method, comprising:

for each of a plurality of respective layers of an object:

performing an intersection routine of a respective plane of the layer with a geometrically watertight computer-aided design (CAD) spline model of the object to directly determine a respective smooth contour curve, wherein, for each of the plurality of respective layers, the smooth contour curve comprises a spline curve representing an intersection of the respective plane of the respective layer with the geometrically watertight CAD spline model; and determining a respective plurality of hatch curves within the respective plane and interior to the respective smooth contour curve;

storing the smooth contour curves and the pluralities of hatch curves in a non-transitory computer-readable memory medium; and sequentially depositing additive manufacturing (AM) material on each of the plurality of layers according to the smooth contour curves and the pluralities of hatch curves.

* * * * *